(12) United States Patent
Wu et al.

(10) Patent No.: US 7,626,931 B2
(45) Date of Patent: Dec. 1, 2009

(54) SYSTEMS AND METHODS FOR COORDINATING WIRELESS TRAFFIC FOR HETEROGENEOUS WIRELESS DEVICES

(75) Inventors: Haitao Wu, Beijing (CN); Yunxin Liu, Beijing (CN); Qian Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 11/089,209

(22) Filed: Mar. 23, 2005

(65) Prior Publication Data

US 2006/0215556 A1    Sep. 28, 2006

(51) Int. Cl.
*H04J 1/16* (2006.01)
(52) U.S. Cl. .................. 370/232; 370/231; 370/235
(58) Field of Classification Search ......... 370/229–236, 370/412
See application file for complete search history.

(56) References Cited

U.S. PATENT DOCUMENTS

| | | | | |
|---|---|---|---|---|
| 6,005,850 | A * | 12/1999 | Moura et al. | 370/282 |
| 6,909,888 | B2 * | 6/2005 | Lee et al. | 455/405 |
| 6,914,900 | B1 * | 7/2005 | Komatsu et al. | 370/356 |
| 6,947,750 | B2 * | 9/2005 | Kakani et al. | 455/452.2 |
| 6,973,315 | B1 * | 12/2005 | Miernik et al. | 455/452.2 |
| 7,096,260 | B1 * | 8/2006 | Zavalkovsky et al. | 709/223 |
| 7,130,268 | B2 * | 10/2006 | Mascolo | 370/232 |
| 7,283,468 | B1 * | 10/2007 | Hill et al. | 370/229 |
| 2004/0228282 | A1 * | 11/2004 | Bao et al. | 370/252 |
| 2005/0213554 | A1 * | 9/2005 | Ginzburg et al. | 370/349 |
| 2007/0242616 | A1 * | 10/2007 | Chang et al. | 370/252 |

OTHER PUBLICATIONS

Merrill et al., Developing a MANET radio for the advanced robotic controller Sep. 2004, IEEE, vol. 4, pp. 2591-2595.*
Bianchi, G., "Performance Analysis of the IEEE 802.11 Distributed Coordination Function" *IEEE Journal on Selected Area in Comm.*, 2000 18(3), 535-547.
Boutremans, C. et al., "Adaptive Joint Playout Buffer and FEC Adjustment for Internet Telephony," *IEEE INFOCOM'03*, 2003, 652-662.
DeCouto, D. et al., "High-throughput Path Metric for Multi-Hop Wireless Routing," *Mobicom*, 2003, 134-146.

(Continued)

*Primary Examiner*—Ricky Ngo
*Assistant Examiner*—Chandrahas Patel
(74) *Attorney, Agent, or Firm*—Woodcock Washburn LLP

(57) ABSTRACT

In view of the foregoing, the present invention provides a unified software framework or architecture for distributed coordination of wireless devices and radios, referred to as Layer 2.5 Software MAC (or 'SoftMAC'), which resides between the standard 802.11 MAC layer (Layer 2) and IP layer (Layer 3) to regulate and control the amount of traffic (both real-time and "best effort") delivered to 802.11 MAC DCF interfaces. The software based design can be ported to different OS platforms and systems and is capable of handling new hardware interfaces and MAC mechanisms (e.g., 802.11e) with only a software upgrade. The invention thus provides a natural way to make end systems support coordination of different radios of device(s), achieving better performance. Advantages of the 2.5 layer software MAC in accordance with the invention include: (a) there are no hardware constraints; (b) heterogeneous wireless/radio support is provided at the 2.5 layer; and (c) an evolutionary and extensible solution with the ability to support future wireless MAC/PHY chip combinations.

19 Claims, 17 Drawing Sheets

OTHER PUBLICATIONS

Draves, R. et al. "Routing in Multi-radio, Multi-hop Wireless Mesh Networks," *Mobicom*, 2004.

Garg, S. et al., "On the Throughput of 802.11b Networks for VoIP," *Avaya TR. ALR-2002-012*, 2002, 1-14.

Goode, Bur, "Voice over Internet Protocol (VoIP)", *Proceedings of the IEEE*, .90 (9) 2002, 1495-1517.

"IEEE draft for Wireless Medium Access Control (MAC) and Physical Layer (PHY) Specifications: Medium Access Control (MAC) Enhancements for Quality of Service (QoS)," *IEEE Std 802.11e/D4.0*, 2004, 1-179.

Johnson, D.B. et al., "The Dynamic Source Routing Protocol for Mobile Ad Hoc Networks (DSR)." *Internet Draft*, 2004. http://www.ietf.org/internet-drafts/draft-ietf-manet-dsr-10.txt, 1-120.

Microsoft Mesh Connectivity Layer (MCL) Software, 2004 http://research.microsoft.com/mesh, 1-24, 1-19.

"NS," URL http://www-mash.cs.berkeley.edu/ns/.

Sagdehi, B., "Opportunistic Media Access For Multirate Ad Hoc Networks," *Mobicom*, 2002, 24-35.

Xu, S., "Does the IEEE 802.11 MAC protocol work well in multihop wireless ad hoc networks?", *IEEE Comm.*, Jun. 2001, 130-137.

\* cited by examiner

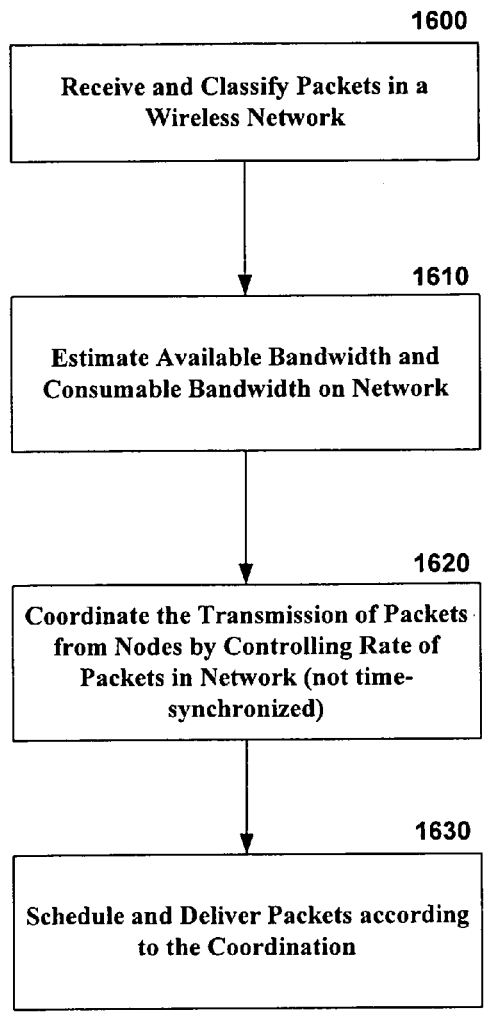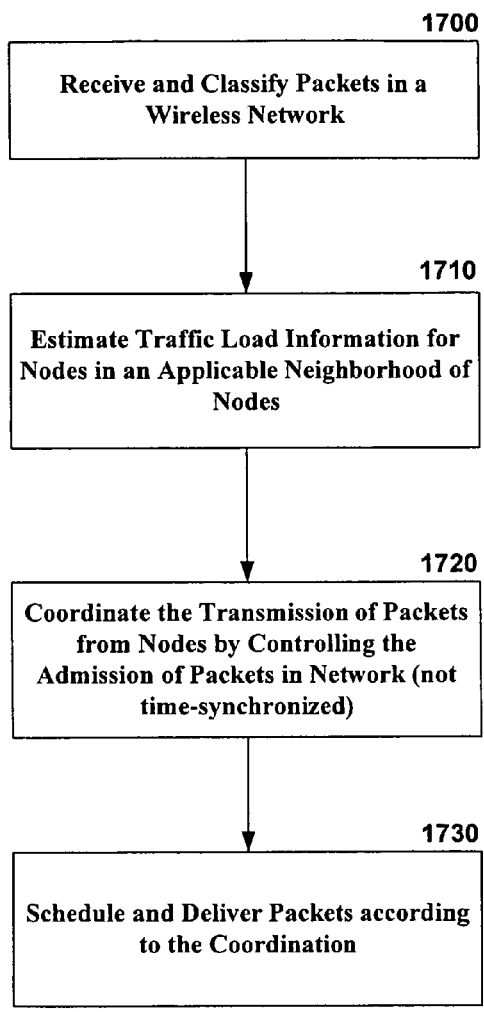
FIG. 16
FIG. 17

SYSTEMS AND METHODS FOR COORDINATING WIRELESS TRAFFIC FOR HETEROGENEOUS WIRELESS DEVICES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright ©2004-2005, Microsoft Corp.

FIELD OF THE INVENTION

The present invention provides systems and methods for coordinating wireless traffic, such as VoIP, across different wireless devices. More particularly, the present invention relates to a software based architecture at a "2.5" Media Access Control layer that coordinates wireless devices and radios.

BACKGROUND OF THE INVENTION

By way of brief background concerning the Media Access Control (MAC) layer, in the Open Systems Interconnection (OSI) model of communication and telecommunication protocols, the MAC layer is one of two sublayers of the Data Link Control (DLC) layer and is concerned with sharing the physical connection to the network among several computers. The other sublayer level in the DLC layer is the Logical Link Control (LLC) sublayer. Making a connection to an Ethernet network usually requires the use of MAC and Physical-Layer Interface (PHY) chips. Currently, from a hardware standpoint, the MAC connects to the PHY using a standard Medium Independent Interface (MII) bus, so different MACs and PHYs can communicate together.

In this regard, each computer has its own unique MAC address that is used by the MAC sublayer of the DLC layer. There is a different MAC sublayer for each physical device type. In a local area network (LAN) or other network, the MAC address of a computer is its unique hardware number. Ethernet is an example of a protocol that works at the MAC layer level. On an Ethernet LAN, the MAC address is the same as the Ethernet address. When connected to the Internet from a computer, or host in terms of the Internet Protocol (IP), a correspondence table relates the computer's IP address to the computer's physical MAC address on the LAN. As described below, however, there are several inflexible limitations to today's MAC layer that render it difficult to achieve easy and reliable network communications with different heterogeneous radios and devices.

Due to their low costs, ease of deployment, increased coverage, and enhanced capacity (e.g., via spatial reuse), multi-hop wireless networks such as mesh networks that utilize inexpensive and readily available 802.11 wireless interfaces are touted as the new frontier of wireless networking. In addition to traditional data services, multi-hop wireless networks have the potential to deliver exciting new real-time services, such as Voice over IP (VoIP) and/or streaming music or video, thereby providing a competitive alternative to cellular networks, and in particular, for geographical areas where cellular networks are not available.

However, there are several challenges in effectively realizing real-time services over multi-hop wireless networks. First, unlike cellular networks where the bandwidth needed for a voice call is reserved (e.g., via CDMA), in an 802.11-based wireless network, all nodes share and compete for the same media (spectrum). Hence, transmissions from neighboring nodes may interfere with each other, causing collision. Although collision can be reduced by the CSMA/CA media access control (MAC) mechanism employed by 802.11, e.g., in distributed coordination function (DCF) mode, such mechanism introduces considerable overhead in terms of air time cost in transmission: although VoIP payloads themselves consume a relatively small amount of air time, the overhead introduced by 802.11 DCF MAC packet headers, MAC acknowledge (ACK) messages, and collision avoidance can be fairly significant, consuming valuable wireless capacity. This problem is further compounded in a multi-hop wireless network where packets are relayed across multiple hops, at any one of which the packet(s) may experience interference or collision. In short, network performance degrades greatly when 802.11 DCF MAC is used in a multi-hop scenario.

Furthermore, since real-time services, such as VoIP, are likely to co-exist with data services over a multi-hop wireless network, using 802.11 DCF MAC delay-sensitive real-time traffic, such as VoIP packets, ends up competing with delay-insensitive "best-effort" (BE) data traffic for access to shared media. On the Internet and in other networks, QoS (Quality of Service) is the idea that transmission rates, error rates, and other characteristics can be measured, improved, and, to some extent, guaranteed in advance. Although enhanced DCF (eDCF), which is the QoS-enhanced 802.11 MAC mechanism, has been developed for infrastructured (i.e., with access points) wireless LANs (WLANs), which works by appropriately controlling a Contention Window (CW) and Inter-Frame Spacing (IFS), eDCF does not provide adequate service differentiation for support of real-time traffic in multi-hop wireless networks because of the hidden terminal and other interference issues.

To support delay-sensitive real-time services—for example, to support VoIP—over 802.11-based multi-hop wireless networks, it would thus be desirable to provide coordination among nodes to regulate and control transmission of VoIP packets and BE data packets for reducing collision and meeting QoS requirements. In particular, it would be desirable to implement such coordination among nodes in a distributed manner using pre-existing standard 802.11 MAC interfaces to avoid having to customize drivers and/or modify existing hardware.

SUMMARY OF THE INVENTION

In view of the foregoing, the present invention provides a unified software framework or architecture for distributed coordination of wireless devices and radios, referred to as Layer 2.5 Software MAC (or 'SoftMAC'), which resides between the standard 802.11 MAC layer (Layer 2) and IP layer (Layer 3) to regulate and control the amount of traffic (both real-time and "best effort") delivered to 802.11 MAC DCF interfaces. The software based design can be ported to different OS platforms and systems and is capable of handling new hardware interfaces and MAC mechanisms (e.g., 802.11e) with only a software upgrade. The invention thus provides a natural way to make end systems support coordination of different radios of device(s), achieving better performance. Advantages of the 2.5 layer software MAC in accordance with the invention include: (a) there are no hardware constraints; (b) heterogeneous wireless/radio support is provided at the 2.5 layer; and (c) an evolutionary and extensible solution with the ability to support future wireless MAC/PHY chip combinations.

Other features of the present invention are described below.

BRIEF DESCRIPTION OF THE DRAWINGS

The system and methods for coordinating wireless devices are further described with reference to the accompanying drawings in which:

FIGS. 16 to 18 illustrate various exemplary, non-limiting flow diagrams showing exemplary uses of the invention;

DETAILED DESCRIPTION OF ILLUSTRATIVE EMBODIMENTS

Overview

Figure 1:
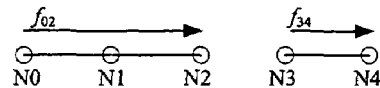
FIG. 1 shows two exemplary scenarios in a simple five-node wireless network utilized to show various aspects of admission control and service differentiation in accordance with the invention.

As generally discussed, the number of wireless devices is increasing continuously in recent years. Wireless access, via cellular or WiFi, is widely deployed and many other wireless technologies, such as WiMax, are on the way. It is thus a goal of the invention to provide coordination among nodes to regulate and control transmission of VoIP packets and BE data packets for reducing collision and meeting QoS requirements. In various embodiments, for instance, the invention endeavors to implement such coordination among nodes in a distributed manner using pre-existing standard 802.11 MAC interfaces to avoid having to customize drivers and/or modify existing hardware. As described in more detail below, the coordination and cooperation at Layer 2.5 by software in accordance with the invention provides significant performance improvements achieving better coordination among different types of devices and protocols.

Thus, the present invention provides a unified software framework for distributed coordination, referred to herein as Layer 2.5 SoftMAC or SoftMAC, which resides between the standard 802.11 MAC layer (Layer 2) and IP layer (Layer 3) to regulate and control the amount of traffic (both real-time and BE) delivered to 802.11 DCF MAC interfaces.

In accordance with the invention, Layer 2.5 SoftMAC achieves distributed coordination without requiring tight clock synchronization or fine-grained transmission scheduling among neighboring nodes, both of which are difficult to implement in multi-hop wireless networks. The distributed admission control (AC) and rate control (RC) algorithms of the invention employ the novel notion of "fraction of air time" to regulate the admissible traffic loads among neighboring nodes and control the transmission of real-time and BE packets.

For 802.11 DCF, the invention may exchange packet rate and packet size at different stations. For 802.11e eDCF, the invention may additionally exchange contention window information for different traffic. For multi-radio network, the invention may exchange information about different spectrum or channels.

In an exemplary, non-limiting embodiment, the Layer 2.5 SoftMAC consists of three main components: i) a distributed admission control (AC) module ii) a rate control (RC) module and iii) a priority queueing module. The AC module regulates the amount of VoIP traffic that is "admissible" in a "neighborhood" by exchanging traffic load information among neighboring nodes and by measuring channel conditions such as collision rate; it also "reserves" bandwidth for a VoIP session along its path by piggybacking bandwidth reservation information in route queries and replies used in on-demand routing protocols such as the dynamic source routing (DSR) protocol. The RC module controls transmission of BE traffic so that the collision probability and impact to real time traffic on other nodes is under control. With respect to the priority queueing module, non-preemptive priority is always provided to VoIP traffic at each node.

The invention thus provides a software based architecture at the 2.5 MAC layer, which coordinates wireless devices and radios. In various exemplary, non-limiting embodiments of the invention, Layer 2.5 SoftMAC is implemented as a network driver interface specification (NDIS) driver in an OS platform, though as described below, the invention may be implemented in any computer readable media. The software based design can be ported to alternate OS systems and is capable of handling new hardware interfaces and MAC mechanisms (e.g., 802.11e) with only a software upgrade. The invention thus provides a natural way to make end system support coordinating between different radios of device(s) to achieve better performance. Advantages of 2.5 layer software MAC in accordance with the invention include: (a) there are no hardware constraints; (b) heterogeneous wireless/radio support is provided at the 2.5 layer; and (c) an evolutionary and extensible solution with ability to support future wireless MAC/PHY chips.

Systems and Methods for Providing a 2.5 MAC Layer

First, an example is utilized herein to illustrate the current challenges in providing VoIP services in multi-hop wireless networks, in particular, the need for coordination among neighboring nodes to control the network load and regulate real-time and BE traffic in support of VoIP.

As mentioned earlier, interference/collision is an issue that affects the performance of wireless networks. Collision introduces delay in packet transmission due to the exponential back-off mechanism used in the 802.11 DCF CSMA/CA MAC. As a result, valuable wireless bandwidth is wasted. To quantify the cost of collision, in accordance with the invention, the notion of air time is introduced, i.e., the time cost introduced at a physical medium to deliver packet(s) from source node to destination node. In addition to the actual packet transmission time, the air time also includes the "overhead" time for carrier sensing, back-off, MAC ACK, retransmission, etc. Clearly, the air time of a packet delivered over a wireless channel is determined by how busy the channel is as well as the number of collisions it experiences, because of the Carrier Sense Multiple Access/Collision Avoidance (CSMA/CA) and back-off mechanisms used in 802.11 DCF. Due to real-time nature of VoIP packets, their end-to-end delay must therefore be bounded. The delay consists of two parts: queueing/buffering and (re)transmission. Both require control of the network load to reduce the channel "busy time" and the collision rate. To illustrate, measurement data was taken from a simple example conducted using a Network Simulator NS2, which is a discrete event simulator targeted at networking research.

FIG. 1 shows a simple five-node wireless network, where each node is equipped with an 802.11b Network Interface Card (NIC) and the channel rate is 11 Mbps. For simplicity, it was assumed that the communication range is equal to interference range. Notation $f_{(i,j)}$ is used to denote the flow from node $N_i$ to node $N_j$, and notation $l_{(i,j)}$ is used to denote the link from node $N_i$ to node $N_j$. The following two scenarios were considered.

In the first scenario, flow $f_{(3,4)}$ is an existing real-time flow in the network, which sends out packets of 1000 bytes every 4 ms, i.e., at a rate of 250 packet/s. Its average end-to-end delay is about 1.3 ms. Next, another real-time flow $f_{(0,2)}$ (with the same flow statistics as $f_{(3,4)}$) arrives, attempting to access the network. Without any explicit load control, adding this new flow into the network causes it to experience an average end-to-end loss rate of 43.8% and an average end-to-end delay of 356 ms, resulting in very poor voice quality. While $f_{(3,4)}$ is affected only slightly, with an average end-to-end delay of 1.4 ms, and negligible (0.0%) loss rate, the poor performance suffered by $f_{(0,2)}$ is due to two major factors: i) link $l_{(0,1)}$ and $l_{(1,2)}$ directly conflict with each other; and more importantly ii) node N3 is a "hidden terminal" (outside the sensing range of N1) that interferes with the packet reception at N2, causing packet collision that leads to backoff and retransmission at N1: the frame loss probability over the channel $l_{(1,2)}$ is 51.7%, resulting in frequent retransmissions, buffer overflow at N1 and increased packet air time over $l_{(1,2)}$. It was further observed that 0.65% packets are dropped at N1 after MAC retransmission, and 43.15% packets are dropped due to buffer overflow at node N1.

In the second scenario, it was assumed that a real-time flow $f_{(0,2)}$ comes first, periodically sending packets of 50 bytes at a rate of 100 packet/s. The observed average end-to-end delay is 1.6 ms and zero packet loss. Then, a "greedy for network bandwidth" BE flow $f_{(3,4)}$ arrives, sending many packets of the maximum packet size of 1500 bytes. Under this scenario, it was observed that the packet loss ratio and packet airtime of $f_{(0,2)}$ is determined by the transmission rate of flow $f_{(3,4)}$. If $f_{(3,4)}$ transmits at 250 packet/s, then the end-to-end loss ratio of flow $f_{(0,2)}$ is 0% and average end-to-end delay is 18 ms. However, if flow $f_{(3,4)}$ transmits at 330 packet/s, then the average end-to-end loss ratio and delay of flow $f_{(0,2)}$ becomes 38.2% and 547 ms. The degraded performance is because the packet transmission at N3 (the hidden terminal) interferes with packet reception at N2.

Moreover, other observations concerning the feasibility of VoIP over multi-hop wireless networks include that when the number of hops for VoIP calls is around 4 to 6, which is typical in a mesh network, around 8 simultaneously VoIP connections can be supported. In such a case, it was found that the large delay and high packet losses were caused by collision/interference and buffer overflow (due to long channel busy time and collision back-off).

In summary, the invention makes it feasible to support VoIP services over multi-hop wireless networks, by making sure that the network load is appropriately controlled. Thus, in various embodiments, the invention keeps the channel busy time and collision rate below certain thresholds to reduce the delay and packet loss rate, in order to ensure acceptable VoIP quality. In controlling the network load, the invention takes into account the existence of both real-time and BE traffic, and their potential interaction.

As discussed generally, the invention provides a software framework, called Layer 2.5 SoftMAC, which supports services, such as VoIP services, over multi-hop wireless networks utilizing off-the-shelf commercial 802.11 a/b/g NICs and standard MAC DCF techniques. Layer 2.5 SoftMAC lies between 802.11 MAC layer and the IP layer: it leverages the (limited) coordination by 802.11 MAC DCF, and extends and enhances 802.11 MAC DCF via software mechanisms for support of VoIP services. The SoftMAC in accordance with the invention employs "coarse-grained" control mechanisms (e.g., distributed admission control and rate regulation) to coordinate and regulate network load and packet transmission of both real-time (RT) and BE traffic among neighboring nodes in a distributed manner, thereby keeping the channel busy time and collision rate below appropriate levels and ensuring acceptable VoIP quality.

Figure 2:
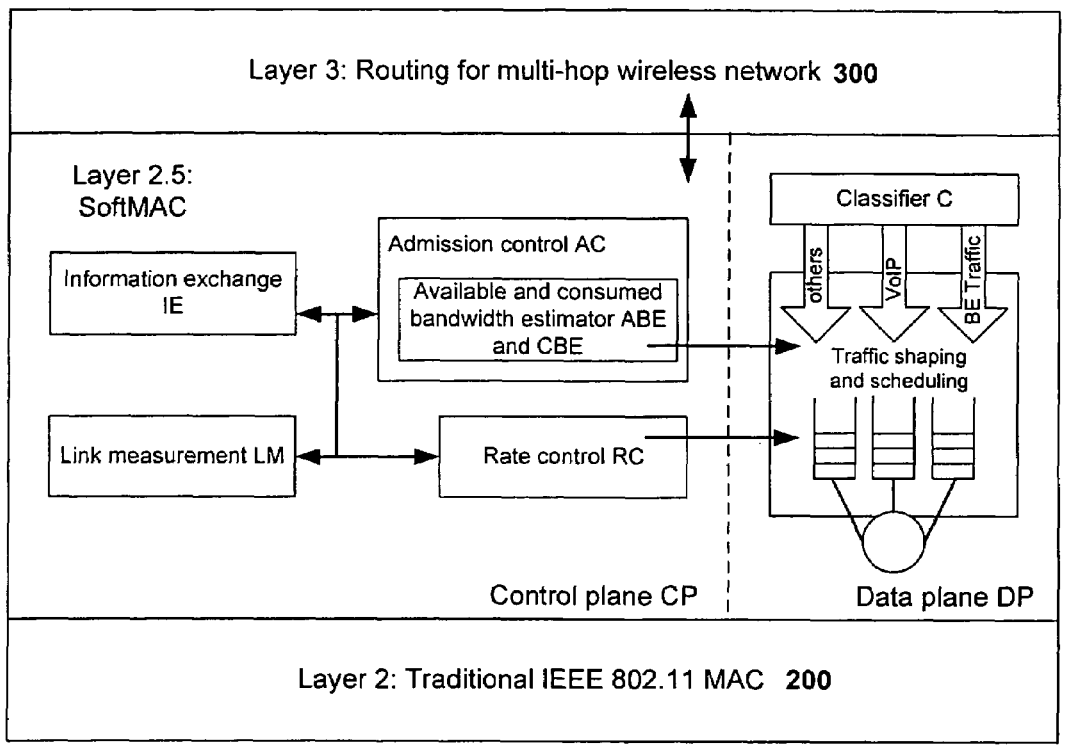
FIG. 2 illustrates an exemplary, non-limiting architecture and components for the 2.5 SoftMAC Layer in accordance with the invention.

FIG. 2 shows an exemplary schematic depiction of an embodiment of the Layer 2.5 SoftMAC architecture in between the IEEE 802.11 MAC layer 200 (traditional layer 2) and the routing for multi-hop wireless network layer 300 (traditional layer 3) in accordance with the invention that is divided into two planes: the control plane CP and data plane DP. The data plane DP includes classifier C for classifying traffic as, for example, VoIP, BE Traffic or other kinds of traffic as well. The traffic is intelligently shaped into scheduled work flows based on input from the AC and RC modules. In this embodiment, there are four modules in the control plane CP: information exchange IE, Link measurement LM, Rate Control RC and Admission Control AC (including available and consumed bandwidth estimator ABE and CBE), which work as follows.

Each node exchanges its RT and BE traffic information explicitly to its neighbors by broadcasting, and measuring the current link status, such as capacity and packet loss ratio. With this information, the consumed and available bandwidth for admission control can be estimated, and the rate of BE traffic can be controlled by rate control. Based on the decisions by control plane modules, priority queueing and traffic shaping are used in the data plane to regulate packet transmission. Advantages of the SoftMAC in accordance with the invention are thus admission control and rate control in the control plane, and the priority queueing mechanism in the data plane.

The distributed AC module decides whether the available resource is sufficient to support new connections. With the invention, the available bandwidth is estimated for each link since different link capacity and packet loss ratio are observed from a node to its different neighbors. For this purpose, the invention considers fraction of air time as a variable to represent the utilization of a physical channel. In accordance with the invention, the bandwidth requirement at the application layer is mapped to the actual air time required at a wireless link, taking header overheads, link capacity and packet collision/loss ratio into account. As a result, more accurate available bandwidth estimation is obtained.

The rate control module RC regulates the rate of BE packets to reduce their impact on existing VoIP calls. More specifically, a portion of the residual air time left by the real-time traffic is allocated to BE traffic in a distributed fashion. The actual air time cost at each link will vary with the currently measured link capacity and packet loss ratio, so the traffic shaper at SoftMAC adjusts the BE transmission rate accordingly.

In the priority queueing module, by default, non-preemptive priority is given to VoIP traffic at each node, so BE packets can only be passed to the MAC layer when there are no VoIP packet(s) waiting to be served. This moves data buffering from the 802.11 MAC layer to SoftMAC to regulate packet transmission.

It is noted that the control mechanisms employed by SoftMAC are in a sense coarse-grained. The invention does not perform fine-grained distributed per-packet scheduling of transmission among neighboring nodes in a manner that controls when packets are transmitted by the MAC to avoid collision because this requires tight clock synchronization among neighboring nodes, which is difficult. Instead, the distributed control mechanisms of the invention control when and how many RT/BE packets are passed to the MAC layer of a node while neighboring nodes still compete for the wireless channel using CSMA/CA to decide when packets are transmitted. Such coarse-grained SoftMAC approach provides compatibility and extensibility with future more powerful wireless MAC and PHY mechanisms. For example, if 802.11e is available, the SoftMAC of the invention can easily take advantage of its ability to differentiate and regulate transmission of packets having different priorities among neighboring nodes in the carrier sensing range, thus simplifying the priority queueing and traffic shaping functions performed in accordance with the invention. Advantageously, the SoftMAC of the invention can be readily upgraded to incorporate enhanced control functions and accommodate new hardware technologies.

Next, exemplary implementations of the control mechanisms and algorithms used in the three key modules in the SoftMAC architecture are described, including: 1) distributed admission control for regulating the real-time (VoIP) traffic load, 2) rate control for minimizing the impact of BE traffic on RT traffic, and 3) priority queueing for VoIP and BE traffic.

Admission Control for VoIP Traffic

To perform admission control to regulate the VoIP traffic load, in accordance with the invention, each node estimates the "available bandwidth" of the (shared) wireless channels. Then, when a new VoIP call request arrives, the required (or consumed) bandwidth for the call on the outgoing link is estimated based on the call request information and the current channel state. Based on these estimates, the AC module checks whether the available bandwidth is sufficient to support the call. If the decision is positive, then the new reservation information is broadcast to make the reservation take effect. In the design of the invention, the reservation message is piggybacked with the routing discovery/query messages for fast pruning. The reservation is kept in "soft state" and is removed after a timeout or by an explicit release message. In the following, some key ingredients of the AC process are described: 1) available bandwidth estimation, 2) consumed (required) bandwidth estimation, 3) admissibility decision, and 4) release of "unused" (i.e., unreserved) bandwidth.

With respect to available bandwidth estimation, unlike wired networks, where the concept of available bandwidth over a wired link is well-defined and can be easily obtained, the notion of "available bandwidth" of a wireless link in an 802.11 wireless network is not straightforward (if not well-defined). First, it is noted that because of ambient interference and contention-based shared media access control, the bandwidth of a wireless channel is not a constant. Due to the auto rate for adaptive modulation selection, the transmission rate of neighboring nodes also varies. Furthermore, frame collision or loss probability experienced by neighboring nodes often differs. As a result, the time needed for transmitting a packet of the same size by a node to the same neighbor at different time instances, or to different neighbors, will be different, depending on the channel conditions and the loads of the neighboring nodes. Hence, when estimating the "available bandwidth" of a wireless channel and the bandwidth consumed/required by a packet, the invention takes into account the channel conditions (e.g., as reflected by frame loss rate) and the traffic load at neighboring nodes.

Instead of directly estimating the available bandwidth of a wireless channel and bandwidth consumed/required by a VoIP/BE packet, the invention introduces the concept of fraction of air time to represent the normalized utilization of a wireless channel. Based on the notion of (packet) air time (cost) introduced earlier—the time required to successfully transmit a packet over a wireless channel that includes actual packet transmission cost as well as MAC ACK time cost, retransmissions cost, etc.—the air time fraction is defined as the ratio of air time consumed/available totally at a time interval to the length of the interval. The interval should generally be large enough comparing with the air time cost for a packet, e.g., we can select 1 second as the interval for DCF. For convenience, the terms bandwidth and fraction of air time are sometimes used interchangeably below.

For admission control, the invention estimates the available bandwidth for each link. Considering the available bandwidth for a link is constrained by both the source node and the destination node, the available bandwidth for each node is first determined, i.e., the available air time fraction at both nodes. Assuming that the carrier sense range is very close to the transmission range, let $l_{(i,j)}$ denote the link from node i to node j, and let $r_{(i,j),RT}$ represent the total fraction of air time on physical medium for real time traffic on link $l_{(i,j)}$. Note here the fraction of air time for a link is directional. The neighbor nodes set for node i is defined as N(i). Here the neighbor means both of the nodes can transmit/receive packet to/from each other. Since DCF needs MAC ACK to confirm the transmission, the neighborhood relationship must be symmetric.

Figure 3:
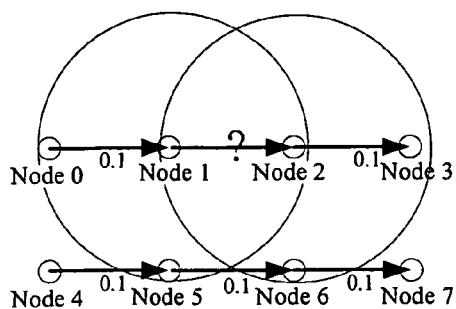
FIG. 3 is an illustrative node example utilized in connection with describing the available bandwidth estimation techniques of the invention.
Figure 4:
FIG. 4 is an illustrative node example utilized in connection with describing the multi-hop bandwidth consumption techniques of the invention.

Next, the available bandwidth estimation procedure is illustrated with reference to the example shown in FIG. 3. FIG. 3 denotes a matrix including 12 nodes and air time occupied at each link is shown.

To estimate the available bandwidth for link $l_{(1,2)}$, the first step is to estimate the available bandwidth for node 1 and node 2, respectively. Generally, each node can only be involved in transmission or reception at any given time. For DCF, the traffic to or from the neighboring nodes with other nodes also conflicts with the transmission of the current node. Therefore, the invention defines the maximum available bandwidth (MAB) for node i as the maximum available air time fraction that can be used for node i, where the air time occupied by all the links to or from a neighbor of node i should be excluded. For example, $MAB_{1,RT}$ for node 1 is:

$$MAB_{1,RT}=1-r_{01,RT}-r_{23,RT}-r_{45,RT}-r_{56,RT}=0.6$$

Similarly, $MAB_{2,RT}=0.6$ can be computed. The definition of MAB of node i is then generalized as:

$$MAB_{i,RT} = 1 - \sum_{m \in N(i) \text{ or } n \in N(i)} r_{mn,RT} \qquad (1)$$

The MAB from (1) is a necessary condition for AB, i.e., an upper bound. To estimate AB, the situation of neighboring nodes is taken into consideration since the transmission at a node will reduce the available bandwidth on its entire neighbors. To make sure the network is not in congestion, the MAB at each node is kept as non negative. For example, $MAB_{1,}$ $_{RT}=0.6$ and $MAB_{5,RT}=0.4$; if node 1 really takes 0.6, then node 5's MAB is −0.2, which means node 5 is overwhelmed, so actually, the available bandwidth that node 1 can occupy is 0.4, that is:

$$AB_{1,RT}=\min(MAB_{1,RT},MAB_{0,RT},MAB_{2,RT},MAB_{5,RT})$$
$$=0.4$$

Similarly, we have $AB_{2,RT}=0.2$, which is constrained by $MAB_{6,RT}=0.2$. Therefore, the minimal MAB of all the nodes in the neighborhood of node i represents the air time fraction that can be allocated for transmission at node i. So the available bandwidth (AB) for node i is given by:

$$AB_{i,RT}=\min(MAB_{i,RT},MAB_{j,RT}),\forall j \in N(i) \qquad (2)$$

Note the value from (2) is regarded as the AB at the node level, which provides the upper bound for the additive available bandwidth on each potential link out going from node i, i.e., all the AB to nodes $j_{,j \in N(i)}$, should be no greater than the value. Since here the estimation does not take the overlapping of traffic in the neighborhood into consideration, it may be regarded conservatively underestimate the available bandwidth at each node.

The available bandwidth of link $l_{(1,2)}$ is then considered, which can be deduced as follows: when node 1 is transmitting to node 2, node 1 make sure all the nodes in node 1 and 2's carrier sense range stay silent, i.e., so that they are transmitting or receiving; otherwise, the transmissions will conflict with each other. If node 1 just uses its AB at 0.4, then the MAB for nodes that are node 1 and 2's neighbor will reduce by 0.4, which would lead to constraining node 6 significantly since its MAB will become −0.2. Thus, the bandwidth for link $l_{(1,2)}$ cannot be greater than the AB at both node 1 and node 2, that is:

$$MAB_{(1,2),RT}=\min(AB_{1,RT},AB_{2,RT})$$

which guarantees that all of the MAB of neighbors of both ends stay positive. Therefore, the maximum available bandwidth for link $l_{(i,j)}$ is estimated as:

$$MAB_{(i,j),R}=\min(AB_{i,RT},AB_{j,RT}),j \in N(i) \qquad (3)$$

In addition, the value is called the maximal AB for link $l_{(i,j)}$ because it represents an upper bound even if we could take the overlapping of air time for links in the neighborhood into consideration by perfect knowledge. The reason is that estimation based on node(s) is less accurate than estimation based on link(s); and similar cases can happen for reservations in slotted systems. In consideration that the information collection overhead introduced to a wireless network should be controlled in a practical manner, the invention employs estimation by (3) and pragmatically ignores overlapping traffic.

With respect to the consumed bandwidth estimation, in the context of VoIP, in accordance with one embodiment of the invention, the traffic is thought of as constant bit rate traffic, although other techniques can be used to reduce bandwidth consumption for voice further, such as silence detection. In one embodiment, it is supposed that the bandwidth requirement from an upper layer application is described with two parameters: packet inter-arrival time ($t_{int}$) in seconds and packet length (PL) in bits. The air time fraction at link $l_{ij}$ can be denoted as:

$$r_{(i,j)RT}=t_{(i,j)PL}/t_{int} \qquad (4)$$

where $t_{(i,j),PL}$ denotes the time cost for a packet with size PL at link $l_{(i,j)}$. Then, assuming the frame loss probability for link $l_{(i,j)}$ is $p_{(i,j)}$, then:

$$t_{(i,j)PL} = \sum_{k=1}^{m} (p_{(i,j)})^{m-1}(1-p_{(i,j)})\left(T_{s,k} + \sum_{l=1}^{k-1} T_{c,l}\right) + \qquad (5)$$
$$(p_{(i,j)})^m m T_{c,m}$$

where m denotes the transmission limitation, and $T_{s,k}$, $T_{c,k}$ denote the air time cost for a successful and failed transmission in the kth try separately. The estimation of $T_{s,k}$, $T_{c,k}$ takes physical link parameters as input, e.g., link rate $C_{(i,j)}$ for link $l_{(i,j)}$. Here, the invention uses (5) as the guide for how much air time cost a packet introduces, which is determined by the overhead, transmission loss probability and physical capacity at the link. It is noted that the packet stream may pass different nodes and links, which means the air time fraction reserved at different nodes may be different. In addition, the loss probability used for estimation is measured for each link as described below, which implicitly assumes the acceptance of the new stream will not increase the current packet loss probability greatly.

With respect to the systems and methods for admission control in accordance with the invention, a key step recognized is the determination of whether the resource is enough to support the new VoIP traffic, i.e., whether the available bandwidth is larger than the consumed bandwidth. To perform the AC correctly, the decision is made taking the traffic introduced by the new VoIP into consideration. For example, suppose node 2 needs to check whether the available bandwidth is enough to support the flow from source node 0 to destination node 5. Its bandwidth consumption of $T_{01}$, $T_{12}$ and $T_{34}$, will also reduce the available bandwidth of link $l_{(2,3)}$. When node 2 estimates its available resource on $l_{23}$, it should take all the future traffic in conflict on the same flow into consideration in advance.

Letting f denote the real time flow to which AC is applied, and $l_{(i,j)} \in f$ denote that flow f will traverse on link $l_{(i,j)}$, and let $CB_{(i,j),f}$ denote the consumed bandwidth of flow f on link $l_{(i,j)}$. Therefore, the total consumed bandwidth in advance for flow f on link l(i,j) is:

$$TCB_{(i,j),f} = \sum_{m \in N(i) \text{ or } n \in N(i)} CB_{(m,n),f}, l_{(i,j)} \in f, l_{(m,n)} \in f \quad (6)$$

So with the TCB for the flow, node i checks whether $TCB_{(i,j),f} \leq AB_{(i,j)}$ is satisfied for AC.

The invention also includes a method to release unused bandwidth. The signaling message releases the bandwidth reservation in at least two cases: 1) when AC fails at some node; those nodes which have reserved the resource for the stream should release it, and 2) when the application quits or before a new route is chosen, the reserved bandwidth along the original route is released too. However, using an explicit message, it can not guaranteed that the nodes with bandwidth reserved will always release it correctly. Thus, implicit resource release is implemented via a timeout process. Thus, the reservation is in soft state, which means the reservation will be cleaned out after the timeout. If the node observes there is no packet arriving for the reservation after a $T_{res-TO}$ value, the reservation is removed and the corresponding resource is released.

With respect to rate control for BE traffic in accordance with the invention, the problem is to distribute the residual air time left by the real-time traffic to BE traffic in a distributed fashion. Thus, according to the invention, each node distributes its residual air time to links in its contention range according to their BE weights, where the BE weight for each link is discussed in more detail below. The goal is achieved by the invention by letting each node announce the bandwidth per unit weight, and each link transmits BE traffic according to the minimal value received.

For each link, there is a BE weight denoted by $w_{(i,j),BE}$, which is broadcast with the real time traffic information. Then, the maximum available bandwidth for BE traffic at each node can be represented as:

$$MAB_{i,BE} = MAB_{i,RT} - \delta_i \sum_{m \in N(i) \text{ or } n \in N(i)} w_{(m,n),BE} \quad (7)$$

where δ denotes the normalized bandwidth per unit weight. To control the impact of BE to real time traffic, the condition $MAB_{i,BE} \geq 0$ should be maintained; therefore:

$$\delta_{i,max} = MAB_{i,RT} / \sum_{m \in N(i) \text{ or } n \in N(i)} w_{(m,n),BE} \quad (8)$$

Each node i will broadcast $\delta_{i,max}$ to control the BE traffic which conflicts with the real time traffic from it. Then, the fraction of air time of BE traffic at link $l_{(i,j)}$ can be controlled by using the minimal received value $\delta_{i,max}$:

$$T_{(i,j),BE} = \min(\delta_{k,max}) \times w_{(i,j),BE}, \forall k \in N(i) \quad (9)$$

With such estimation, the impact of BE to real time are under control. Each node still estimates what the actual sending rate is for the BE packet by using (5) with the average BE packet length. Then, the problem is how to choose the BE weight for each link. In accordance with an embodiment of the invention, the long time BE traffic is considered and it is assumed that all the BE flows are greedy, so we just use the BE flow number at each link as its BE weight. We regard to alternate embodiments for how to choose BE weight, e.g., the BE weight can be chosen as an averaged queue length.

With respect to priority queueing for service differentiation in accordance with the invention, at each node, the service differentiation algorithm provides VoIP traffic with high priority and BE traffic low priority. The signaling traffic for resource reservation and information update, as well as the routing traffic will be given the highest priority. So the scheduling in a node is a three queue priority scheduling. It is noted that pure priority scheduling is described here for its simplicity and the consideration to reduce the delay of VoIP. The invention also contemplates other scheduling processes known to those of ordinary skill in the art that are consistent with the scheduling goals of the invention.

Exemplary System Design and Implementation

The SoftMAC architecture and the processes and algorithms for VoIP in multi-hop wireless networks in accordance with the invention were described in exemplary detail above. In this section, an exemplary non-limiting system design for implementing SoftMAC is illustrated. In an exemplary embodiment, the invention is embodied as a NDIS driver of an OS, although it should be clear that the invention may be implemented as interface(s), as part of the OS itself, as standalone software, or any computer readable media, or combination of the foregoing.

The modules are implemented according to the architecture described in connection with FIG. 2. To provide priority queueing at the SoftMAC layer of the invention, the buffer at layer two is removed. Link status is measured, including current link capacity $C_{(i,j)}$ and loss rate $p_{(i,j)}$ for each neighbor, to estimate available/consumed bandwidth for admission control and rate control. In addition, admission control is combined in dynamic source routing to help achieve fast pruning. Each node broadcasts its traffic information to its neighbors to exchange information in accordance with the invention, as described in more detail below.

Figure 5:
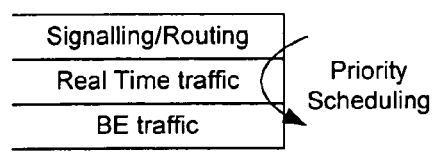
FIG. 5 illustrates exemplary priority queuing performed for three queues in accordance with the invention.

With respect to priority queueing and traffic shaping, priority queueing for VoIP support is considered in this example. Currently, three types of queues are supported in accordance with the invention. The type of service (TOS) field in an IP header is used to indicate the service level that the flow should obtain. The signaling queue is for signaling packets such as Address Resolution Protocol (ARP) packets, routing protocol signaling packets and so on. Real-time queue is for real-time traffic, such as VoIP traffic. BE queue is for best-effort traffic such FTP downloading traffic. The implementation uses a strict priority based scheduler as shown in FIG. 5. In one embodiment, to implement priority queueing in SoftMAC, local per-packet level control is achieved by removing buffer at layer two, i.e., buffering packets only at the SoftMAC layer.

Figure 6:
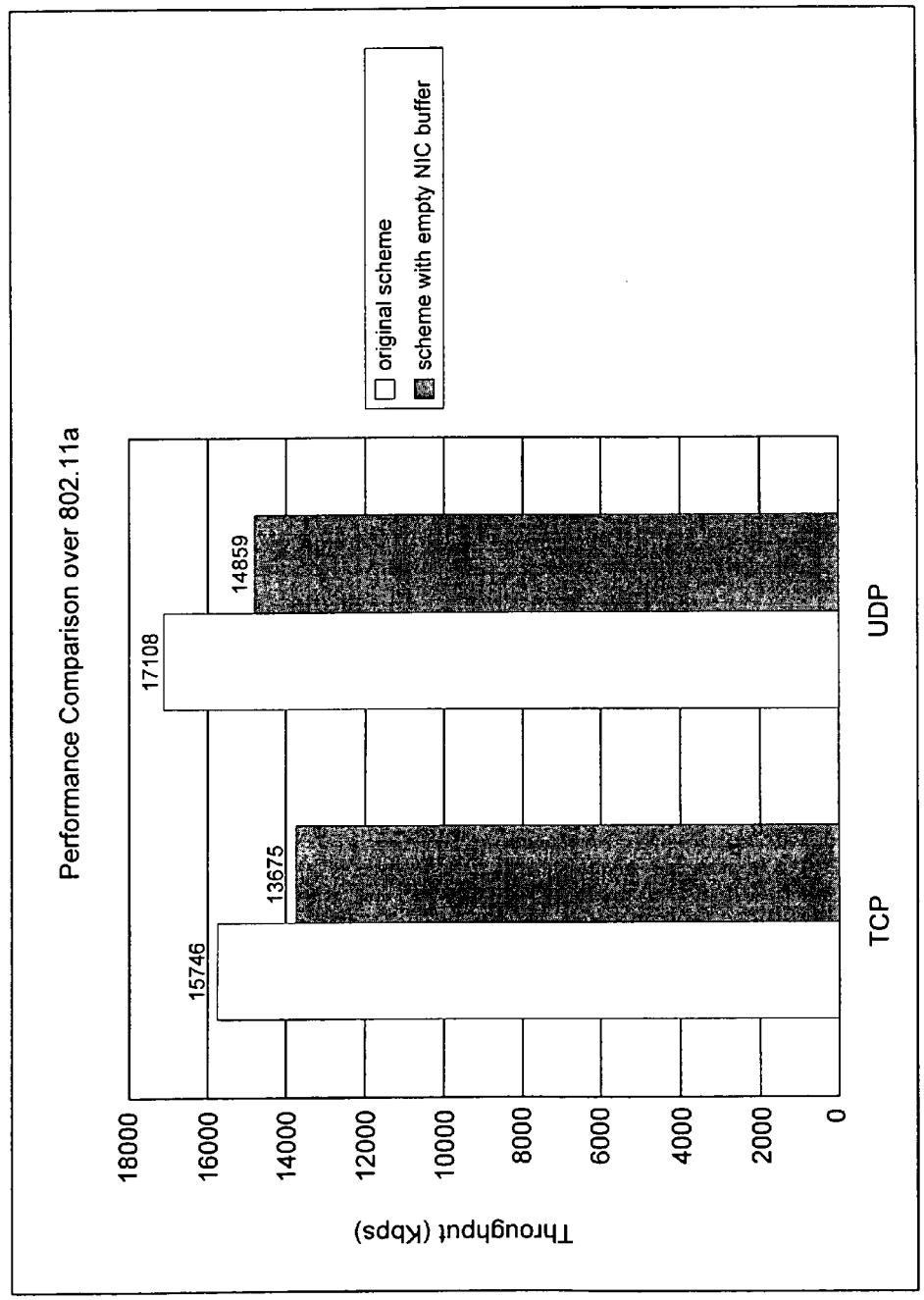
FIG. 6 is a chart illustrating performance characteristics by using an embodiment of the SoftMAC layer in accordance with the invention.

As mentioned, in one embodiment, SoftMAC was implemented as a driver in an OS, e.g., NDIS driver in Windows, such that the default packet sending behavior of NDIS was altered by the invention. To empty the NIC's buffer, the protocol driver sends out packets if the previous packet is not in the pending state. Then, packets are sent out one by one such that there are never multiple packets in the NIC's buffer. This introduces some inefficiency to the NIC's performance in terms of throughput. FIG. 6 shows the test results of TCP/UDP throughput comparison over an IEEE 802.11a wireless link between the scheme with an empty NIC buffer and the original scheme. FIG. 6 shows that the overhead is less than 14 percent. With such overhead, the packet sending behavior can be controlled by SoftMAC in accordance with the invention.

In one embodiment, a token bucket is used to control the BE traffic rate on each link. Each node then computes the token generation rate according to equations (5) and (9).

With respect to measurement of frame loss probability (FLP), in the presently described non-limiting exemplary implementation, each node sends out a broadcast packet to exchange information. Then, the broadcast packet reception ratio is measured to deduce the FLP $p_{(i,j)}$ used in (5) for link $l_{(i,j)}$. The FLP measured by broadcast is generally expected to be close to that of a unicast packet. Furthermore, MAC ACK experiences much lower collision probability, since the Network Allocation Vector (NAV) of the other nodes in the communication range of the source are set by the data packet transmission. Therefore, the loss probability of ACK is ignored and instead, the broadcast packet loss ratio from source to destination is used as the FLP on the link. The value is directional, i.e., the metric from node x to y may be different from node y to x, which was confirmed via test.

For example, the broadcast packets of the invention can be sent out every 0.5 seconds, and the ratio can be measured by using the broadcast received in a 5 second sliding window.

With respect to measurement of physical link capacity, the actual link capacity is measured by probing when the NIC is working at auto rate mode. For a wired network, a packet-pair (two back-to-back probe packets) has been used to measure the bandwidth. For CSMA/CA based DCF, a packet-pair based scheme will underestimate the capacity, especially when the physical bandwidth is large. The reason is that the overhead introduced in MAC and PHY headers, backoff, etc., can not be ignored. By assuming the minimal overhead introduced is stable, the difference of the two samples can be used in minimum with different packet size to remove its impact. More specifically, the physical bandwidth can be measured by probing as follows: the sender sends out three probe packets back-to-back, and the probe packet sizes are small ($PL_s$), small ($PL_s$) and large($PL_l$) respectively, where $PL_{s(l)}$ denotes the probe packet size, respectively. The interval between the first and second probe is denoted as $T_{int-ss}$, and the second and the third probe is denoted as $T_{int-sl}$. Then the bandwidth $C_{(i,j)}$ for link $l_{(i,j)}$ can be estimated as, $$C_{(i,j)} = (PL_l - PL_s)/(\min(T_{int-sl}) - \min(T_{int-ss})) \quad (10)$$

where the min( ) function denotes the minimal value from recent 10 consecutive samples. The advantage of this method is that it reduces the impact of un-deterministic overhead introduced in transmission. In an exemplary implementation of the invention, each node picks a neighbor randomly and sends probe packets to measure the bandwidth every second.

With respect to the combination of admission control and DSR, to speed up the AC and reservation, we use a hop-by-hop AC technique combined with DSR. DSR achieves a route-request by broadcasting to find the destination, and the destination replies with a route-reply to notify the route to source. The invention adds the information for bandwidth consumption by (5), to the DSR routing header of the route-request/reply to perform AC. Upon route request, AC is used to check whether the resource is enough for fast pruning, and no reservation is made even it passes AC; upon route-reply, the resource is reserved only after it passes AC.

When a node in the middle of the potential route to the destination receives the route-request, AC is based on partial routing information collected so far in the DSR header. A check is made whether the destination is its neighbor or neighbor's neighbor to predict the TCB in (6), where the information can be obtained by overhearing the periodic broadcast from a neighbor. If available bandwidth for all the potential output links is not enough, the node will drop the route request silently and not continue the rebroadcast for the route request.

For route-reply, the route information in the DSR header is used to judge whether the available bandwidth for the link is enough, and if not, then the route reply is discarded and a route reply failure message is generated and sent back to the destination node. Then, the destination can send a route-reply on other routes. If the AC of the VoIP passes, then the node will send the route-reply out and record the flow information, which will be broadcasted to other nodes.

With respect to a broadcast for information exchange in accordance with the invention, as described, each node estimates AB for each out link to determine whether there are enough resources to support the requirement for the real time flow. Besides, a node indicates how much resources have been allocated and how much are left to other nodes. The SoftMAC module on each node broadcasts the following information: MAB, AB, Real time (VoIP) traffic to/from each neighbor, BE traffic weight to/from each neighbor, BE bandwidth per unit weight. Here the broadcast lies in two parts: 1) Periodic broadcast—a timer is included and each node broadcasts its information every $T_{broadcast}$ seconds. 2) Trigger based update—every time a node accepts and reserves bandwidth for real time flow or releases bandwidth allocated to real time traffic, the node broadcasts its updated information immediately.

Exemplary Simulation and Experiment Results

In this section, some simulation and experiment results are presented. For simulation, SoftMAC was implemented using a NS-2 simulator and its wireless extension. For experiments, SoftMAC was implemented as a NDIS driver for a Windows OS. As to the VoIP application, the codec was specified by the GSM 06.10 specification. The frame interval used was 20 ms/frame, and the payload by the codec was 33 bytes. With an application header of 12 bytes, a user datagram protocol (UDP) header of 8 bytes, and an IP header of 20 bytes, the total payload was 73 bytes.

Figure 7:
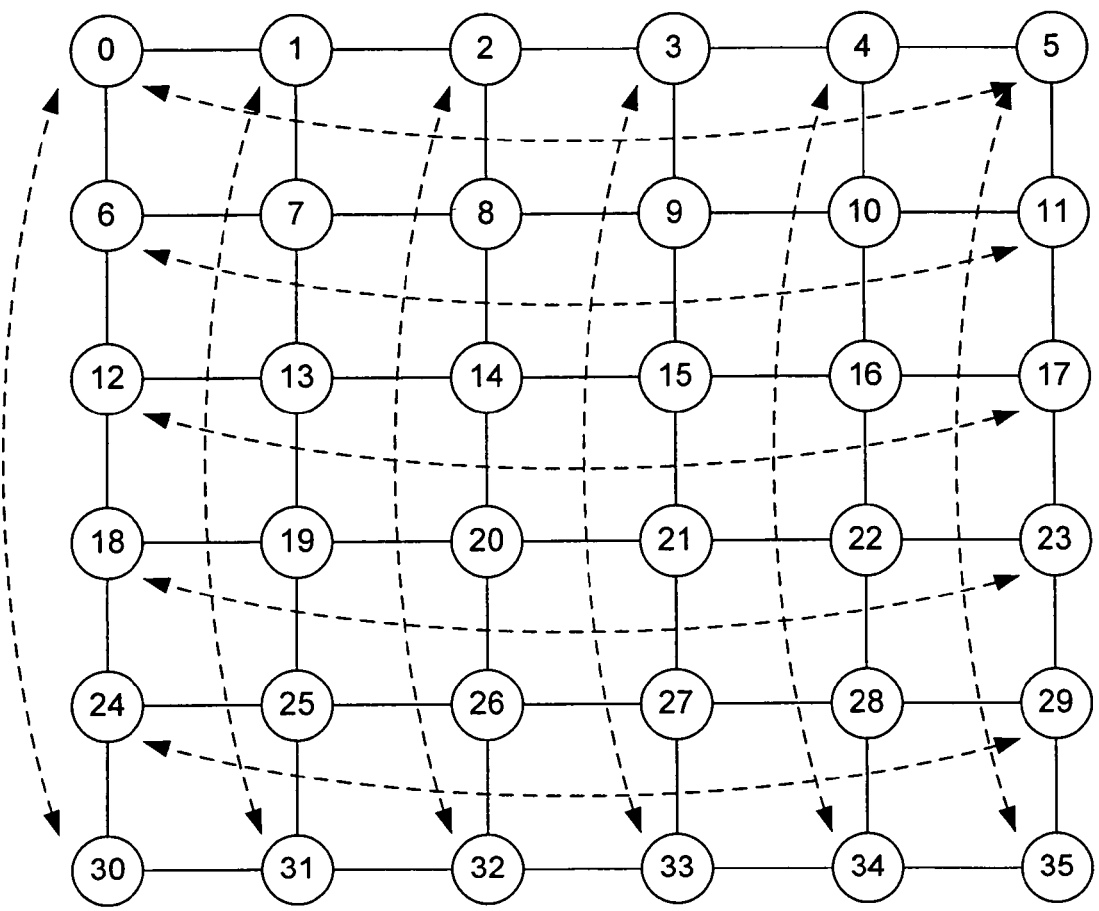
FIG. 7 is an exemplary grid topology and traffic pattern illustration utilized in connection with describing the various SoftMAC techniques in accordance with the invention.

The simulation results are classified according to the processes described above concerning admission control and rate control separately. A mesh network on grid with 36 nodes was constructed (See FIG. 7), where the solid lines represent the potential links between nodes, while the dashed line represents the potential traffic stream. Streams were only generated from one end to the other horizontally or vertically, respectively. The network parameters were all set for 802.11a DCF at a 24 Mbps physical rate with RTS/CTS disabled. Two continuous bit rate (CBR) connections were used to enumerate the traffic of a VoIP call following the parameters set for the VoIP application.

Figure 8:
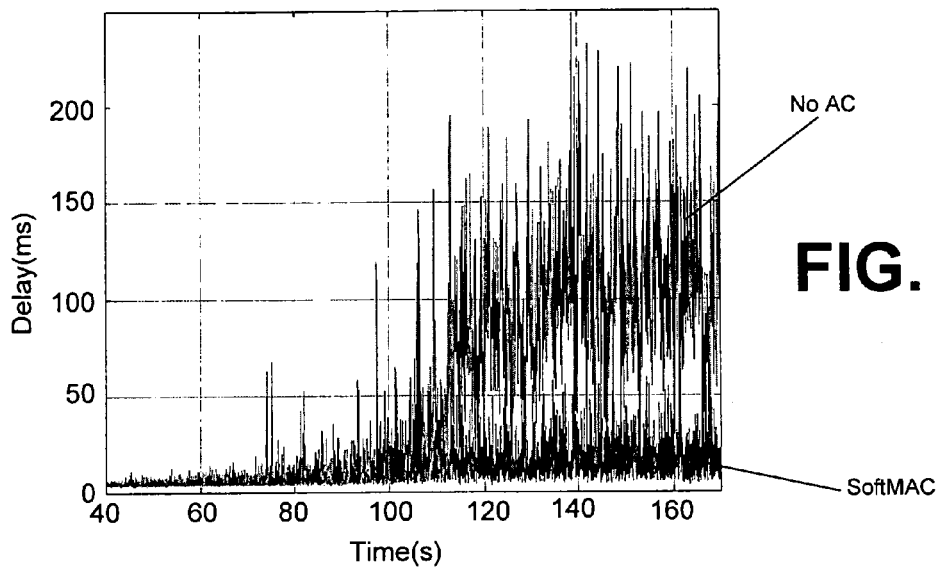
FIG. 8 is a graph illustrating the results of an exemplary end-to-end delay comparison with and without admission control of the invention.
Figure 9:
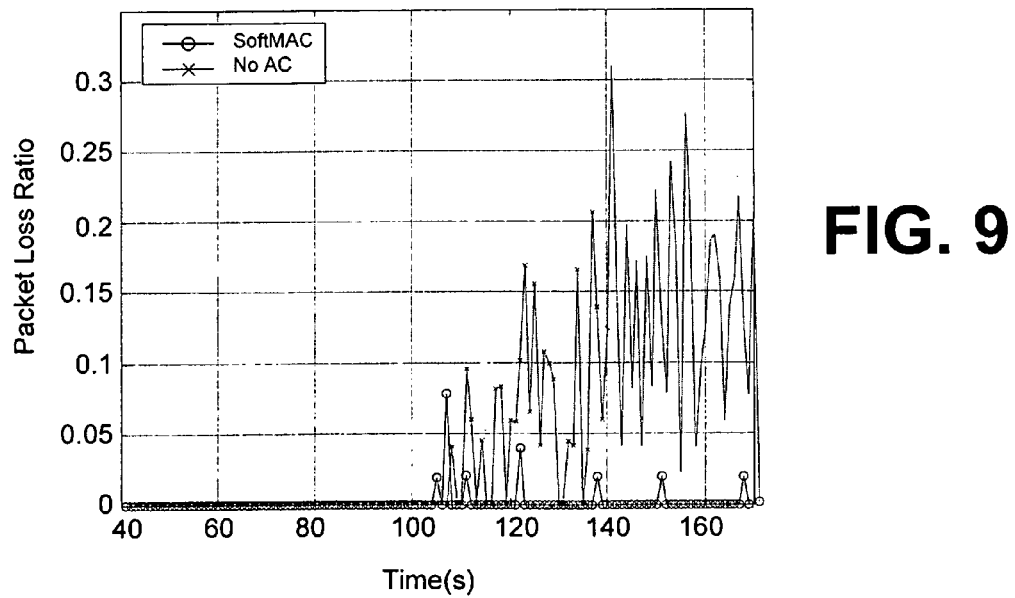
FIG. 9 is a graph illustrating the results of an exemplary packet loss ratio comparison with and without admission control of the invention.

For admission control for VoIP, 24 VoIP streams were generated and injected into the network, one by one, every 4 seconds from second 24, and the simulation was continued for 50 s after the last stream is injected at second 116. Without AC, if 23 VoIP streams were injected, the performance of VoIP is acceptable; while if 24 VoIP streams are injected, 4 of the streams will suffer. With AC in SoftMAC, 22 VoIP steams are accepted, illustrating that the decision of AC is accurate. Thus, the end-to-end one way delay and packet loss ratio was demonstrated for one stream that suffered. The delay comparison is shown in FIG. 8, where the worst case delay over SoftMAC is observed to be less than 50 ms, while without AC, the delay is much higher. From a delay budge analysis perspective, the delay budge left for networking was about 80 ms. In addition, to achieve acceptable voice quality, the packet loss of VoIP was kept below 10% even with error concealment algorithms. The end-to-end packet loss ratio with AC was demonstrated to be relatively low while, without AC, the end-to-end packet loss ratio is much higher, as shown in FIG. 9.

With respect to rate control for BE traffic, 3 VoIP streams were placed in the network, from node 0/12/24 to node 5/17/23, respectively. Then, a 12 BE file transfer protocol (FTP) was downloaded by TCP SACK every 2 seconds into the network, 6 BE files on horizontal and 6 BE files on vertical, respectively. The result delay and packet loss rate of VoIP was compared, and the throughput of TCP was measured.

Figure 10:
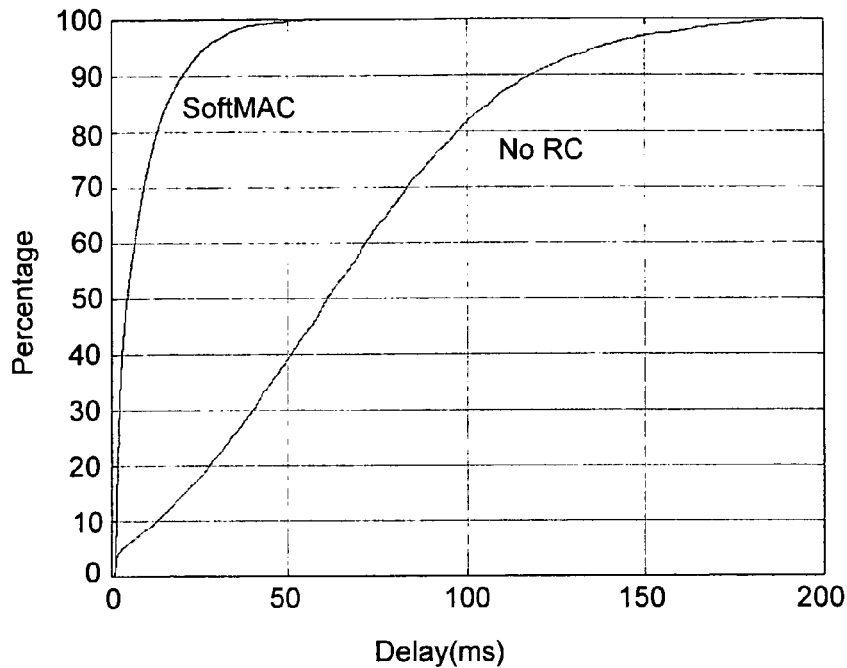
FIG. 10 is a graph illustrating the results of an exemplary end-to-end delay of VoIP with and without rate control of the invention.
Figure 11:
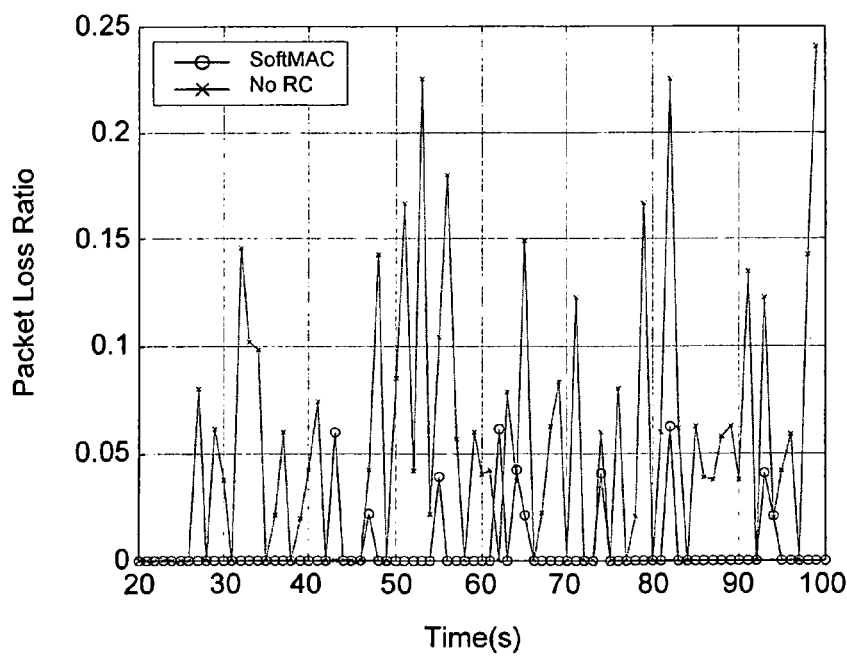
FIG. 11 is a graph illustrating the results of an exemplary end-to-end packet loss ratio of VoIP with and without rate control of the invention.
Figure 12:
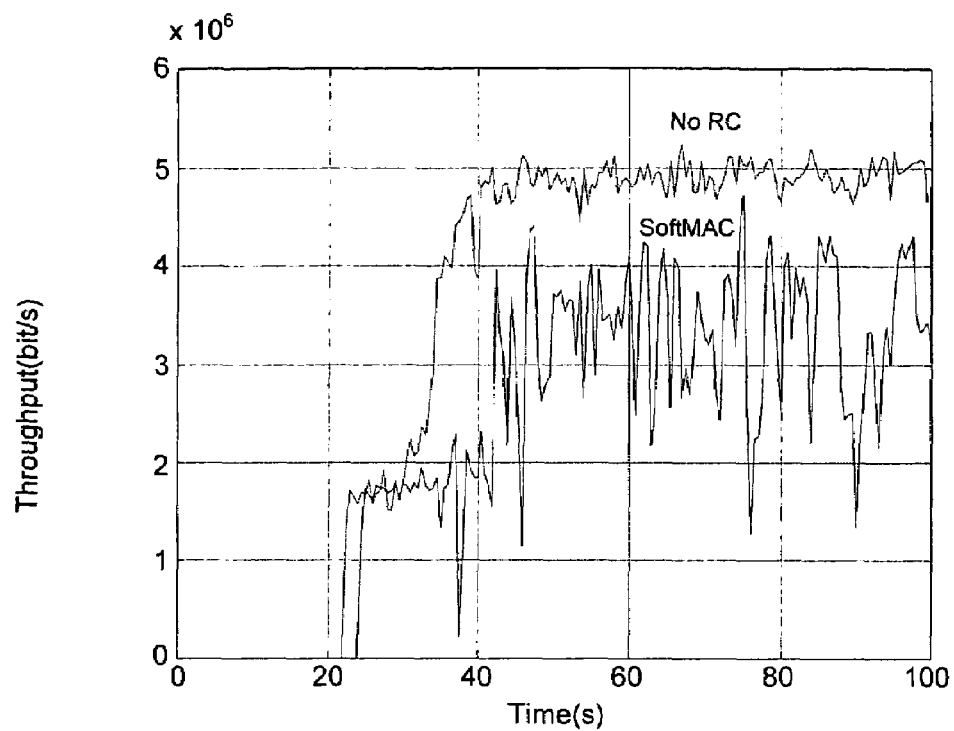
FIG. 12 is a graph illustrating the results of an exemplary total throughput of TCP with and without rate control of the invention.

The comparison of delay and packet loss rate for VoIP is shown in FIG. 10 and FIG. 11, respectively. Since both RC and priority queueing were implemented, the one way delay achieved by VoIP is shown to be lower than the previous case. The delay of VoIP can be large, and more than 30% samples were observed to be delayed longer than 80 ms. Combining the impact of delay and loss together, the performance of VoIP is relatively poor. To achieve good performance of VoIP, thus, it was observed that if the total throughput of TCP is controlled, then the degradation is acceptable as illustrated in FIG. 12. In FIG. 12, the oscillation in the throughput of TCP is caused by the priority queueing at SoftMAC to reduce the VoIP delay.

As to experimental results gained from an actual testbed, a 32-node wireless testbed was built, which was located on one floor of a fairly typical office building. All the nodes were placed in fixed locations and were not moved during testing. Each node was a PC, and equipped with one dual-band A/G network card with 802.11 a/b/g support. All the nodes operated in the Institute of Electrical and Electronics Engineers (IEEE) 802.11a mode. The autorate selection on the cards was enabled and RTS/CTS was disabled. The implementation used a Mesh Connectivity Layer (MCL) and its driver was installed on each PC in the testbed.

Figure 13:
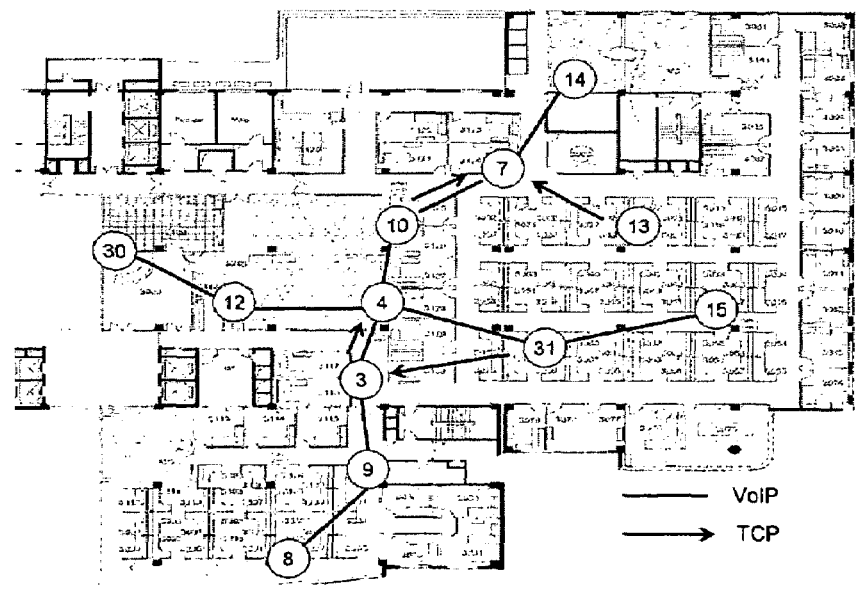
FIG. 13 illustrates an exemplary experiment topology utilized in accordance with the invention.
Figure 14:
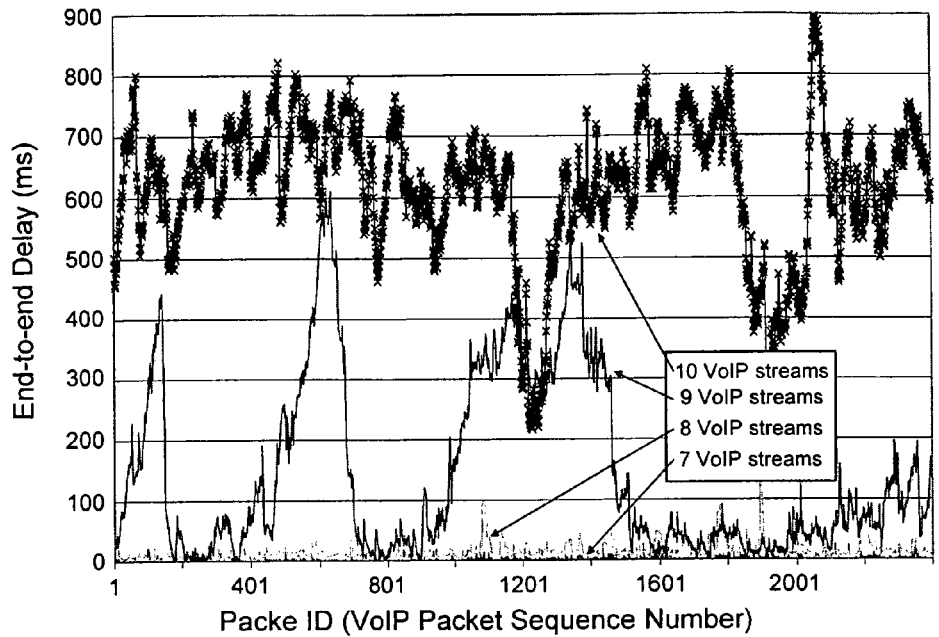
FIG. 14 is a graph illustrating the results of an exemplary end-to-end delay comparison for admission control (AC) of the invention.

A simple 5 hop chain topology was used to verify the accuracy of AC under real circumstances. All the VoIP traffic was generated between node 7 and node 8 on path 8-9-3-4-10-7, as illustrated in FIG. 13. With AC disabled, as shown in FIG. 14, the results were collected for 7~10 VoIP streams simultaneously running. It was observed that the system can serve 8 simultaneous VoIP with good quality; however, when there are 9 or more streams, the delay of VoIP increases dramatically. With AC enabled, only 7 VoIP stream were accepted, and the performance was similar to the 7 VoIP streams of the non-AC case in FIG. 14. Thus, the AC of the invention was demonstrated to be efficacious in achieving its goals.

Figure 15:
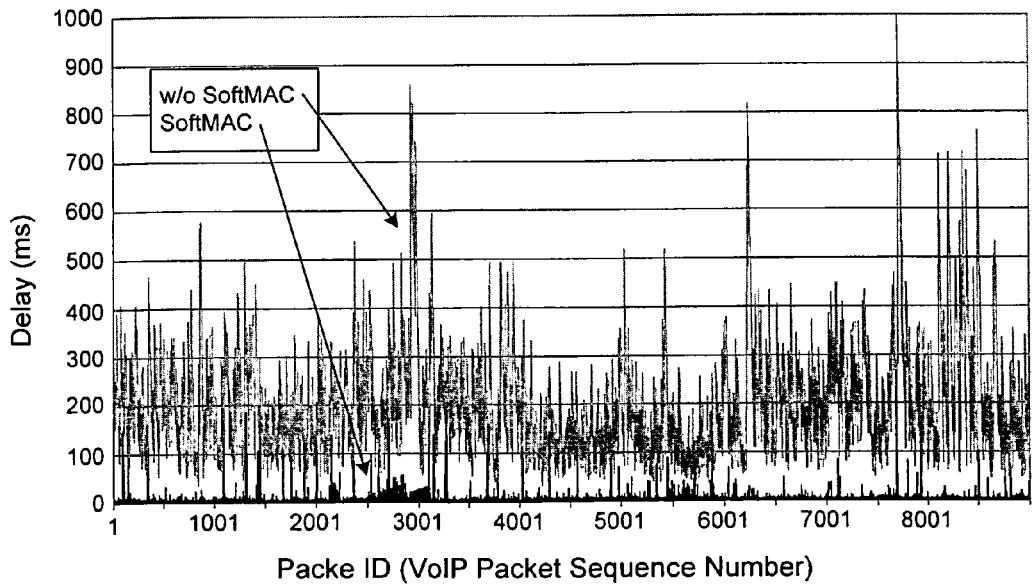
FIG. 15 is a graph illustrating the results of an exemplary end-to-end delay comparison for rate control (RC) of the invention.
Figure 18:
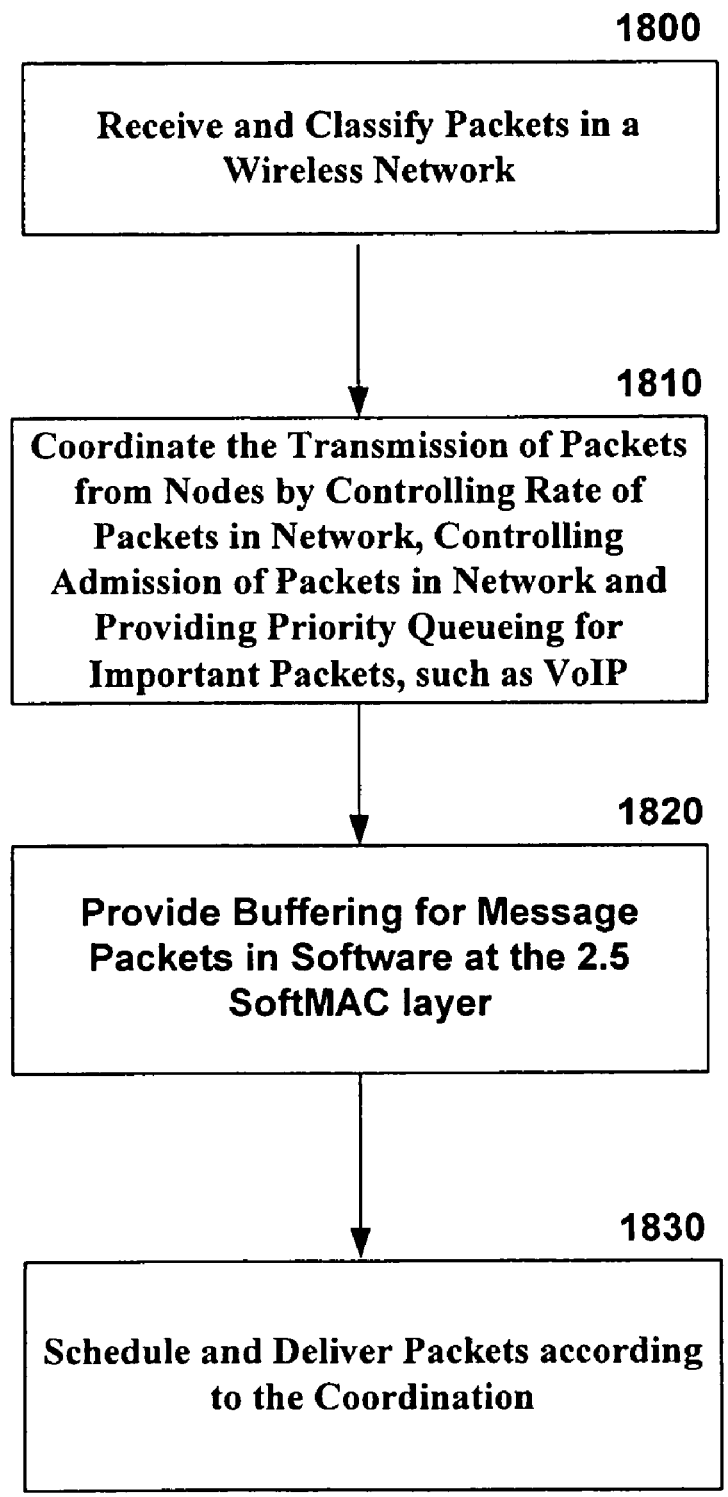

Also, to verify the efficacy of RC in SoftMAC, experimental results were collected on 11 nodes of the testbed, as shown in FIG. 13. Two VoIP calls were setup on path 30-12-4-31-15 and path 9-3-4-10-7-14. Four TCP flows were added as exemplary best-effort traffic, from node 3/10/31/13 to node 4/7/4/7, respectively. The end-to-end one way delay of the VoIP packets from node 9 to node 14 were measured, for our SoftMAC driver enabled and disabled, respectively, as shown in FIG. 15 illustrating the comparison between with and without the SoftMAC layer of the invention. The results shown in FIG. 15 demonstrats that SoftMAC significantly reduces the end-to-end one way delay of VoIP packets by controlling the BE TCP traffic rate and providing priority queueing. The voice quality was observed to be very smooth with SoftMAC, while it was distorted w/o SoftMAC. Additionally, it was observed that the TCP throughput decreases about 30~50% with SoftMAC to provide better delay results for VoIP.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for coordinating wireless traffic in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services and processes. Application data, Web services, VoIP applications, music players, etc. generate a lot of data that must be transmitted back and forth potentially in a wireless manner across heterogeneous devices, and thus the techniques for coordinating wireless traffic in accordance with the present invention can be applied with great efficacy in those environments.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for coordinating wireless traffic in accordance with the invention.

Figure 19A:
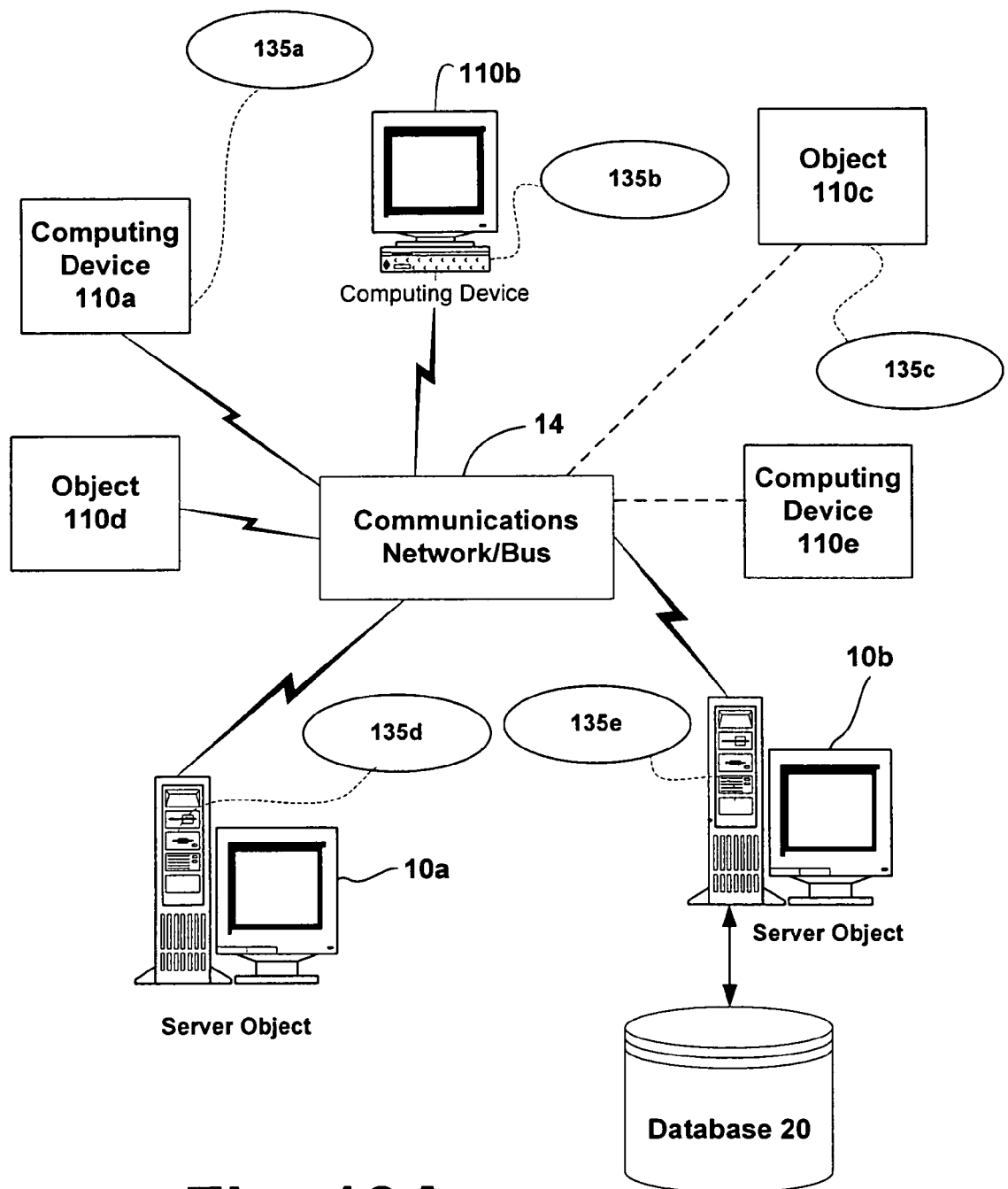
FIG. 19A is a block diagram representing a suitable computing system environment in which the present invention may be implemented.

FIG. 19A provides a schematic diagram of an exemplary networked or distributed computing environment. The distributed computing environment comprises computing objects 10*a*, 10*b*, etc. and computing objects or devices 110*a*, 110*b*, 110*c*, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 19A, and may itself represent multiple interconnected networks. In accordance with an aspect of the invention, each object 10*a*, 10*b*, etc. or 110*a*, 110*b*, 110*c*, etc. may contain an application that might make use of an API, or other object, software, firmware and/or hardware, suitable for use with the systems and methods for coordinating wireless traffic in accordance with the invention.

It can also be appreciated that an object, such as 110*c*, may be hosted on another computing device 10*a*, 10*b*, etc. or 110*a*, 110*b*, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to coordinating wireless traffic according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, moving forward, computing devices will require ways of sharing data, such as data accessed or utilized incident to program objects, which coordinate traffic in accordance with the present invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 19A, as an example, computers 110a, 110b, etc. can be thought of as clients and computers 10a, 10b, etc. can be thought of as servers where servers 10a, 10b, etc. maintain the data that is then replicated to client computers 110a, 110b, etc., although any computer can be considered a client, a server, or both, depending on the circumstances. Any of these computing devices may be processing data or requesting services or tasks that may implicate the coordination of wireless traffic in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for coordinating wireless traffic in accordance with the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 19A illustrates an exemplary networked or distributed environment, with server(s) in communication with client computer (s) via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to efficiently deliver wireless traffic, including VoIP data.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

As mentioned, communications may be wired or wireless, or a combination, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135a, 135b, 135c, etc. and with connections or access to various types of storage elements or objects, across which files or data streams may be stored or to which portion (s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed or saved according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 19B:
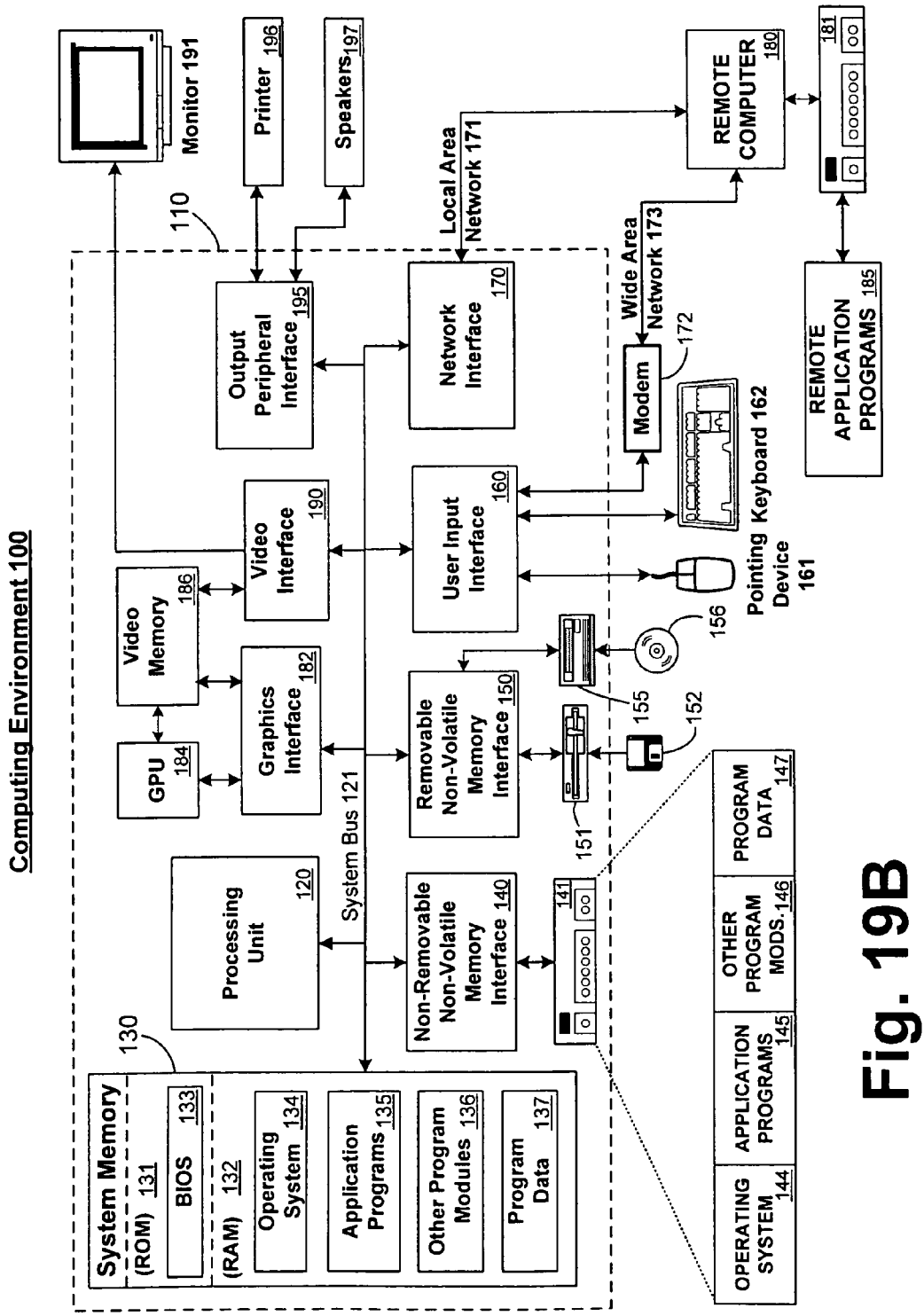
FIG. 19B is a block diagram representing an exemplary network environment in which the present invention may be implemented.

FIG. 19B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that it is desirable to flexibly, or quickly process data in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the techniques for downloading algorithmic elements to a coprocessor in accordance with the invention.

Although not required, the invention can be implemented via an operating system, for use by a developer of services for a device or object, and/or included within application software that operates in connection with the methods for coordinating wireless traffic in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes, as described above.

FIG. 19B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 19B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and/or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 19B illustrates operating system 134, application programs 135, other program modules 136, and program data 137.

The computer 110 may also include other removable/non-removable, volatile/nonvolatile computer storage media. By way of example only, FIG. 19B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 19B provide storage of computer readable instructions, data structures, program modules and other data for the computer 110. In FIG. 19B, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they may be different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more coprocessors, such as graphics processing units (GPUs) 184, may communicate with graphics interface 182. In this regard, GPUs 184 generally include on-chip memory storage, such as register storage and GPUs 184 communicate with a video memory 186, wherein the methods for downloading algorithmic elements to a coprocessor of the invention have particular impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 19B. The logical connections depicted in FIG. 19B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. Data communications device 172, such as a modem, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 19B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for coordinating wireless traffic in accordance with the invention may be included in, supported in or accessed via all of the languages and services enabled by managed code, such as .NET code, and in other distributed computing frameworks as well.

Exemplary Interface Implementations

For any exchange of data among multiple computers, such as VoIP traffic coordinated according to the techniques of the invention and shared between two computers, there are interfaces for handling the various operations on each computer that can be implemented in hardware and/or software and which operate to receive, send and/or process the data in some fashion, according to the relevant applications and services being requested or provided. To the extent that one or more interface objects may be provided to achieve or implement any portion of the systems and methods for compressing and decompressing markup data in accordance with the invention, the invention is intended to encompass all such embodiments, and thus a general description of the kinds of interfaces that might be provided or utilized when implementing or carrying out the invention follows.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 20A:
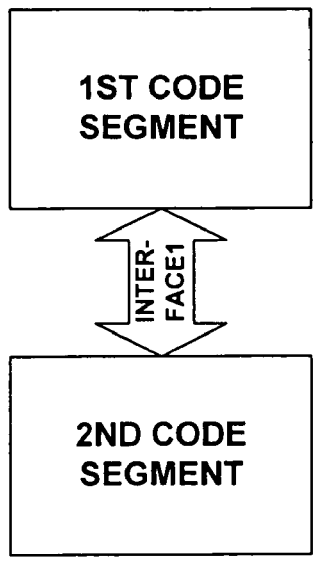
FIGS. 20A to 25B illustrate exemplary ways in which similar interface code can be provided to achieve similar or equivalent objective(s) of any interface(s) in accordance with the invention.
Figure 20B:
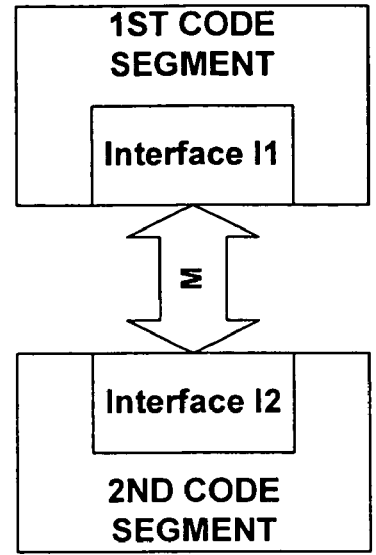

Notionally, a programming interface may be viewed generically, as shown in FIG. 20A or FIG. 20B. FIG. 20A illustrates an interface Interface1 as a conduit through which first and second code segments communicate. FIG. 20B illustrates an interface as comprising interface objects I1 and I2 (which may or may not be part of the first and second code segments), which enable first and second code segments of a system to communicate via medium M. In the view of FIG. 20B, one may consider interface objects I1 and I2 as separate interfaces of the same system and one may also consider that objects I1 and I2 plus medium M comprise the interface. Although FIGS. 20A and 20B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 20A and 20B, but they nonetheless perform a similar function to accomplish the same overall result. We will now briefly describe some illustrative alternative implementations of a programming interface.

A. Factoring

Figure 21A:
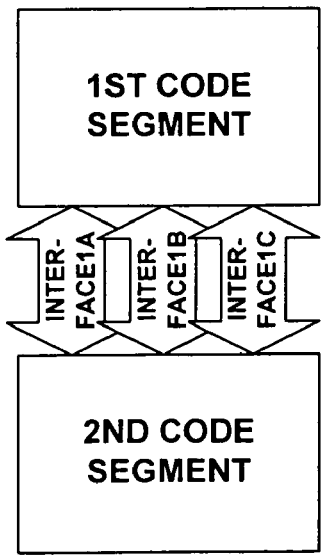
Figure 21B:
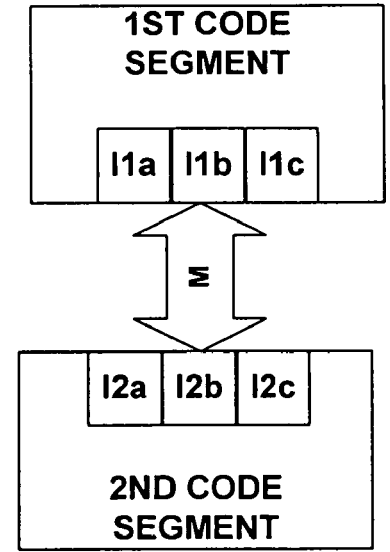

A communication from one code segment to another may be accomplished indirectly by breaking the communication into multiple discrete communications. This is depicted schematically in FIGS. 21A and 21B. As shown, some interfaces can be described in terms of divisible sets of functionality. Thus, the interface functionality of FIGS. 20A and 20B may be factored to achieve the same result, just as one may mathematically provide 24, or 2 times 2 time 3 times 2. Accordingly, as illustrated in FIG. 21A, the function provided by interface Interface1 may be subdivided to convert the communications of the interface into multiple interfaces Interface 1A, Interface 1B, Interface 1C, etc. while achieving the same result. As illustrated in FIG. 21B, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the $1^{st}$ code segment need not match the number of interfaces included with the $2^{nd}$ code segment. In either of the cases of FIGS. 21A and 21B, the functional spirit of interfaces Interface1 and I1 remain the same as with FIGS. 20A and 20B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 22A:
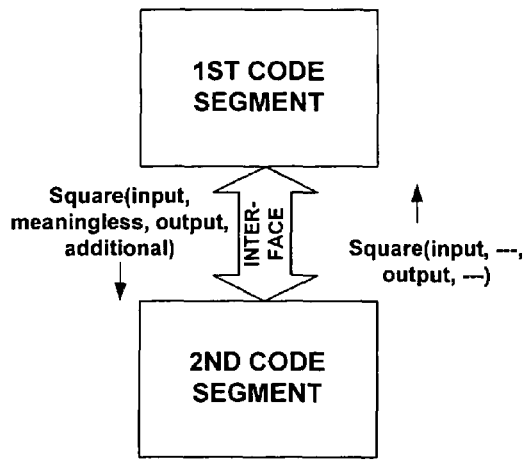
Figure 22B:
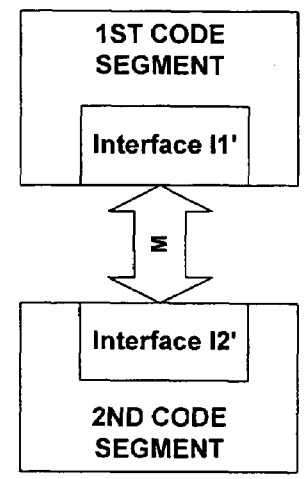

In some cases, it may be possible to ignore, add or redefine certain aspects (e.g., parameters) of a programming interface while still accomplishing the intended result. This is illustrated in FIGS. 22A and 22B. For example, assume interface Interface1 of FIG. 20A includes a function call Square(input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 22A, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 22B, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 23A:
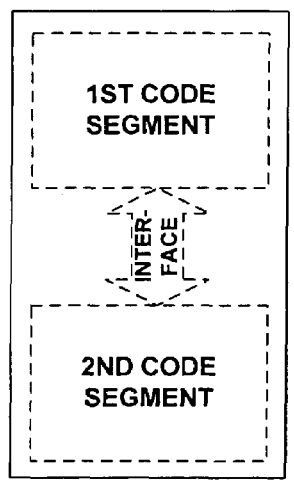
Figure 23B:
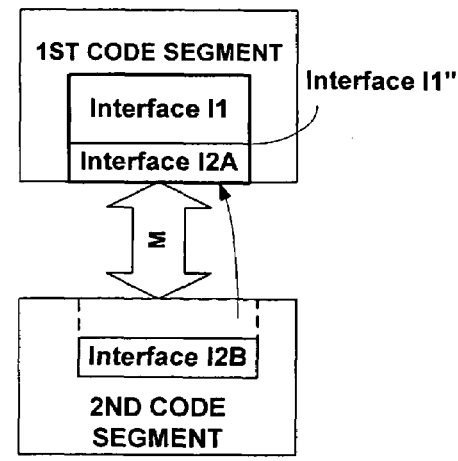

It may also be feasible to merge some or all of the functionality of two separate code modules such that the "interface" between them changes form. For example, the functionality of FIGS. 20A and 20B may be converted to the functionality of FIGS. 23A and 23B, respectively. In FIG. 23A, the previous $1^{st}$ and $2^{nd}$ Code Segments of FIG. 20A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 23B, part (or all) of interface I2 from FIG. 20B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 20B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 24A:
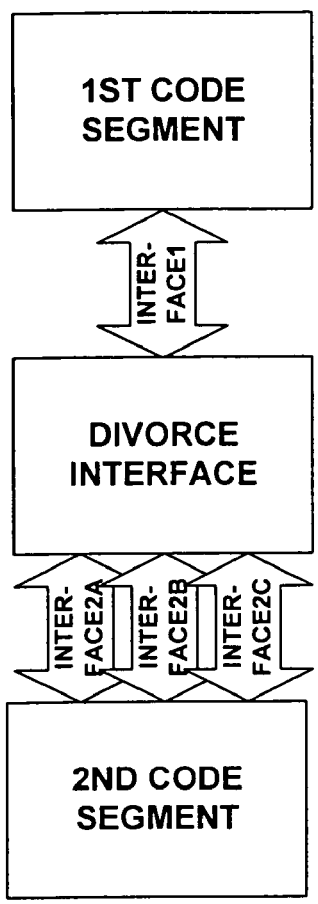
Figure 24B:
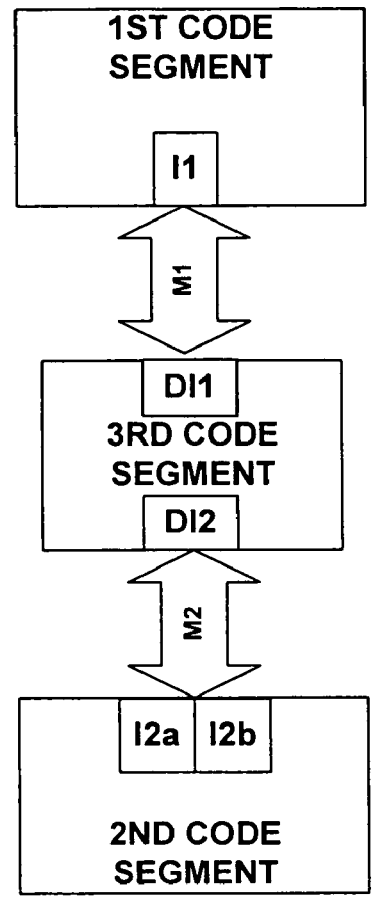

A communication from one code segment to another may be accomplished indirectly by breaking the communication into multiple discrete communications. This is depicted schematically in FIGS. 24A and 24B. As shown in FIG. 24A, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 24B, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 20B to a new operating system, while providing the same or similar functional result.

E. Rewriting

Figure 25A:
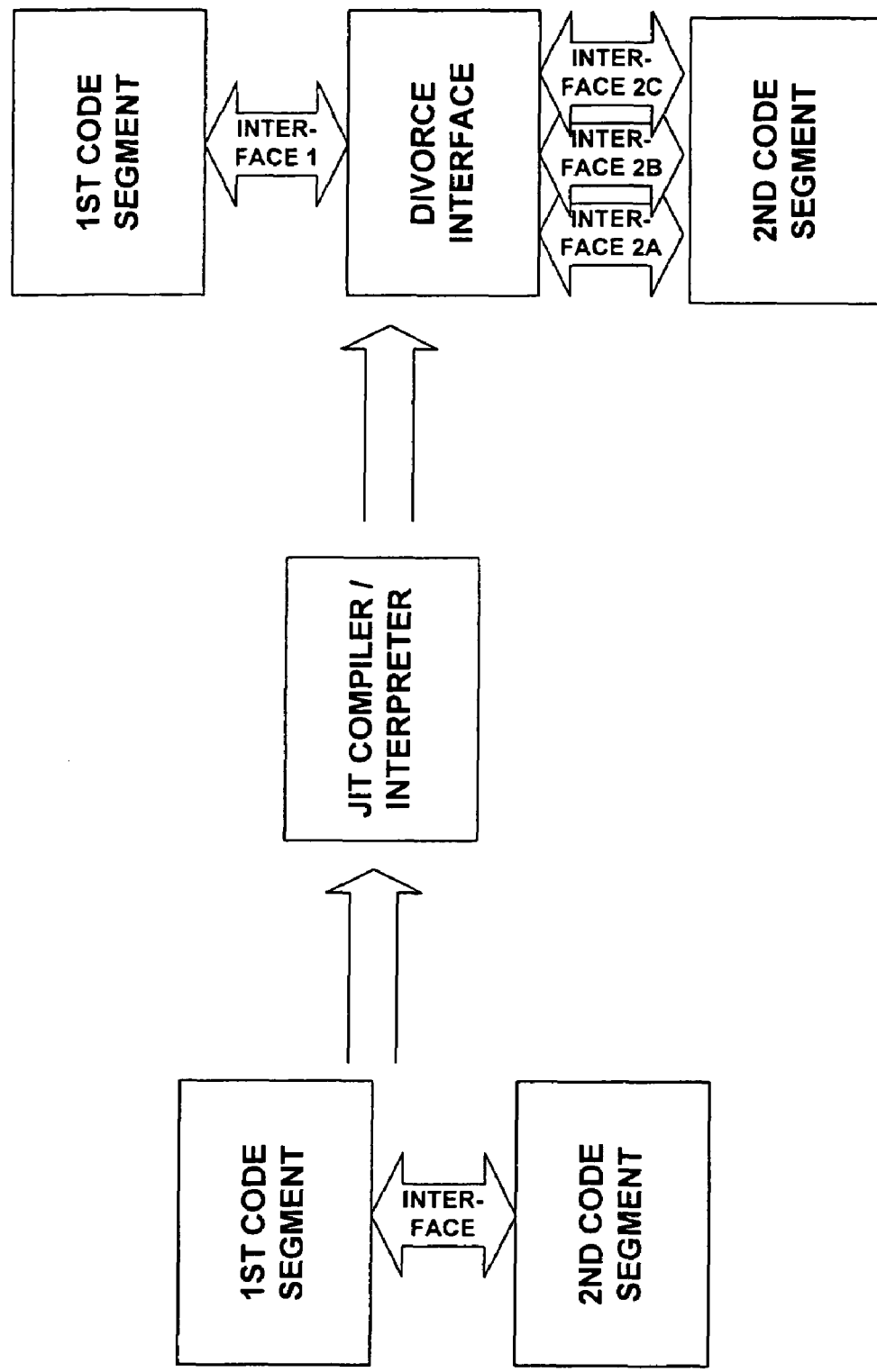
Figure 25B:
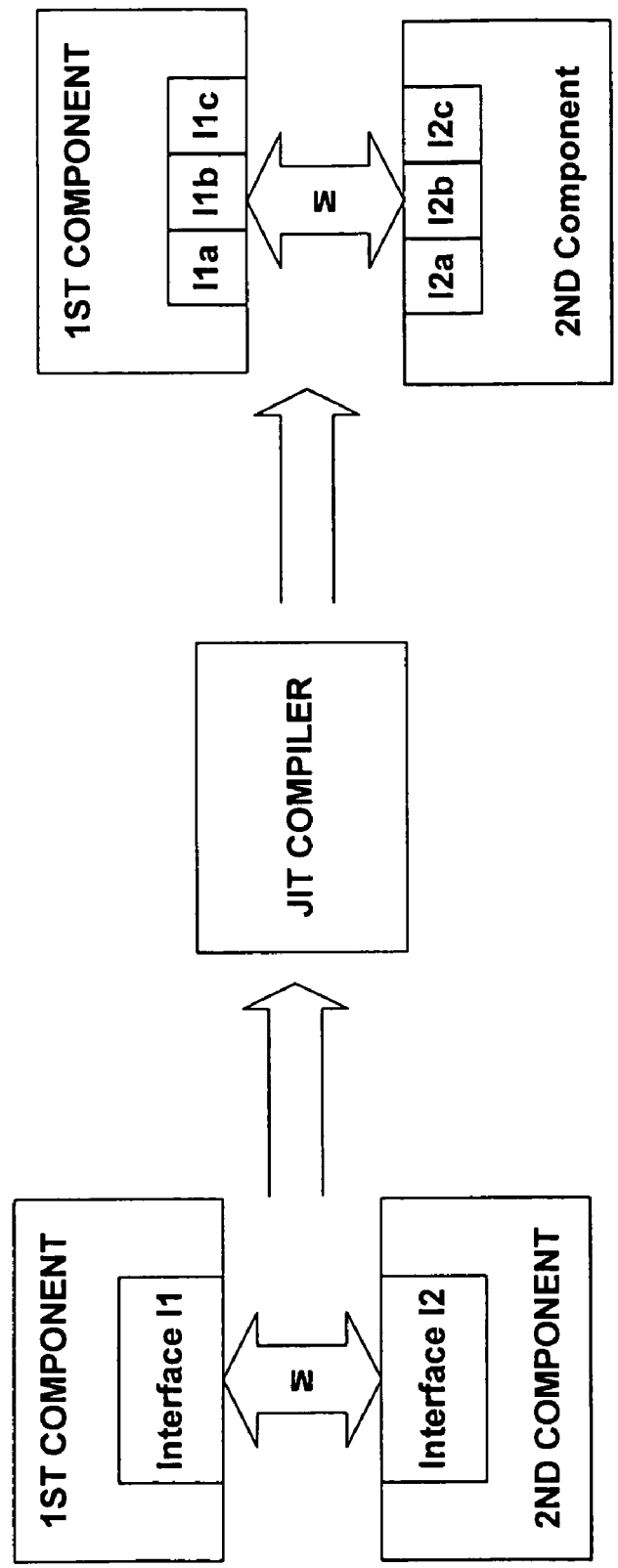

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 25A and 25B. As can be seen in FIG. 25A, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 25B, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 20A and 20B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

CONCLUSION

Wireless devices, such as notebook computers, PocketPCs, PocketPCPhones and SmartPhones, are becoming more and more powerful and ubiquitous. Some devices are provided with multiple radios, e.g., a dual mode phone is equipped with GPRS and WiFi capabilities simultaneously, but no coordination between those devices has been considered. The Media Access (MAC) layer is primarily responsible for controlling the flow of data over a network, ensuring that transmission errors are detected, and ensuring that transmissions are appropriately synchronized. Today, however, MAC layer solutions are relatively fixed, lacking the ability to extend their capabilities and thus, hardware/driver modification is required to achieve such extension, a much more painful and difficult proposition.

Thus, the present invention provides systems and methods for improving cooperation and coordination between wireless devices on a wireless network. Although the invention is not limited to VoIP traffic, and could equally be applied to any high priority content, such as content or data downloads, such as programs, movies, tv shows, or music, as described herein, the invention provides a practical VoIP solution over 802.11 DCF based on a multi-hop wireless network model. Advantageously, the invention provides coordination among nodes in a neighborhood as necessary to regulate and control transmission of VoIP packets and BE data packets to reduce collisions and to otherwise meet QoS requirements. The goal of distributed coordination, without requiring tight clock synchronization, is achieved by a new unified 2.5 SoftMAC layer, a software module between the network layer and the NIC driver (original layer 2 MAC).

With the admission control and reservation techniques described herein for VoIP, along with priority queueing, and BE traffic rate control, service differentiation for VoIP can be achieved. Smooth voice quality was observed by a VoIP application applied to a wireless testbed, even where a large volume of BE traffic was injected. While the invention is not limited to such embodiment, the invention was implemented and demonstrated in a Windows NDIS driver, though the invention applies equally to other OSes, such as Linux, and can be implemented as computer readable media in any form, including interfaces, part of the OS, etc., and thus the invention is not limited to any particular form of code or medium.

There are multiple ways of implementing the present invention, e.g., an appropriate API, tool kit, driver code, operating system, control, standalone or downloadable software object, etc. which enables applications and services to use the systems and methods for coordinating wireless traffic in accordance with the invention. The invention contemplates the use of the invention from the standpoint of an API (or other software object), as well as from a software or hardware object that receives data in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to coordinate wireless traffic across heterogeneous devices. For instance, the algorithm(s) and/or hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize Layer 2.5 SoftMAC of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether primarily wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Gaming consoles, for instance, ever on the cutting edge of graphics rendering are becoming networked experiences, and as VoIP data is delivered to and from gaming consoles, the invention can be applied to such environment.

While exemplary embodiments refer to utilizing the present invention in the context of particular programming language constructs, the invention is not so limited, but rather may be implemented in any language to provide methods for coordinating wireless traffic in accordance with the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A method for coordinating wireless message packet transmission for a plurality of wireless devices of a multi-hop wireless network having a plurality of nodes so as to regulate VoIP traffic load in the wireless network, the method comprising controlling the admission of message packets into a neighborhood of nodes of the plurality of nodes based on an estimate of traffic in the neighborhood by:
   estimating at each node in the neighborhood an amount of available bandwidth from wireless channels shared in the neighborhood;
   receiving a request for a new VoIP call;
   estimating a required bandwidth for the new VoIP call on an outgoing link based on call request information and a current channel state, the estimating of the required bandwidth including taking into consideration, when calculating the estimated required bandwidth, that the VoIP call comprises the message packets which are delay-sensitive and are to be delivered in near-order and near-real-time by way of the multi-hop wireless network;
   determining based on the estimated required bandwidth and the available bandwidth that the available bandwidth is sufficient to support the new VoIP call;
   upon determining that the available bandwidth is sufficient to support the call, a particular one of the plurality of the nodes which is to host the VoIP call broadcasting reservation information to the other nodes to reserve the estimated required bandwidth for the new VoIP call on the outgoing link, the broadcast reservation information being piggybacked with routing discovery/query messages; and
   releasing the reserved estimated required bandwidth after one of a timeout and an explicit release message,
   the estimating of each of the available and required bandwidths including taking into consideration, when calculating the estimated bandwidth, time required to successfully transmit packets over a channel including actual packet transmission cost and ancillary costs relating to packet collision avoidance in the wireless network, the ancillary costs including overhead time required for carrier sensing, back-off, MAC ACK, and retransmission.

2. The method of claim 1 further comprising:
   coordinating transmission of message packets from all of the plurality of nodes according to at least one parameter measured in the network, wherein the coordinating is not time-synchronized.

3. A method according to claim 2, further including determining, as one of the at least one parameter, an estimate of available bandwidth on the wireless network and an estimate of consumable bandwidth on the wireless network and comparing the estimates.

4. A method according to claim 2, wherein the at least one parameter includes determining the type of message packets being at least one of transmitted or received by the plurality of nodes, and controlling the admission of message packets based on the available bandwidth in the wireless network.

5. A method according to claim 2, further comprising buffering message packets to be delivered in the network under control of software.

6. A computer readable storage medium comprising computer executable instructions for performing the method of claim 2.

7. A computing device comprising means for performing the method of claim 2.

8. A method according to claim 2, further including determining, as one of the at least one parameter, the average rate of message packets being at least one of transmitted or received by the plurality of nodes.

9. A method according to claim 1, wherein said controlling includes exchanging traffic load information among the nodes of the neighborhood.

10. A method according to claim 1, wherein said controlling includes measuring channel conditions including message collision rate.

11. A computing device including means for performing the method of claim 1.

12. An application programming interface comprising computer executable interface modules for performing the method of claim 1.

13. The method of claim 1 further comprising:
   coordinating the transmission of message packets from all of the plurality of nodes according to at least one parameter measured in the network; and
   pursuant to said coordinating, buffering message packets in software according to priority scheduling determined by said coordinating.

14. A method according to claim 13, wherein said coordinating includes prioritizing VoIP message packets according to a higher priority than BE traffic.

15. The method of claim 1 further comprising:
   controlling the rate of message packets into the plurality of nodes based on an estimate of collision probability of message packets in the wireless network.

16. A computing device including means for performing the method of claim 15.

17. A computer readable storage medium comprising computer executable interface modules having computer executable instructions for performing the method of claim 15.

18. A method according to claim 15, wherein said controlling includes controlling the transmission of best efforts traffic so that the collision probability and impact to real time traffic on other nodes is under control.

19. A method according to claim 18, wherein said controlling include giving priority to VoIP traffic at each node.

* * * * *